(12) United States Patent
Carter

(10) Patent No.: US 10,936,590 B2
(45) Date of Patent: Mar. 2, 2021

(54) BLOOM FILTER SERIES

(71) Applicant: Joshua Daniel Carter, Lafayette, CO (US)

(72) Inventor: Joshua Daniel Carter, Lafayette, CO (US)

(73) Assignee: Spectra Logic Corporation, Boulder, CO (US)

( * ) Notice: Subject to any disclaimer, the term of this patent is extended or adjusted under 35 U.S.C. 154(b) by 152 days.

(21) Appl. No.: 15/993,141

(22) Filed: May 30, 2018

(65) Prior Publication Data
US 2019/0370374 A1 Dec. 5, 2019

(51) Int. Cl.
*G06F 17/00* (2019.01)
*G06F 16/2453* (2019.01)
*G06F 16/22* (2019.01)

(52) U.S. Cl.
CPC .... *G06F 16/24545* (2019.01); *G06F 16/2255* (2019.01)

(58) Field of Classification Search
CPC .................. G06F 16/24545; G06F 16/2255
See application file for complete search history.

(56) References Cited

U.S. PATENT DOCUMENTS

| | | | |
|---|---|---|---|
| 5,701,464 A | 12/1997 | Aucsmith | |
| 6,920,477 B2* | 7/2005 | Mitzenmacher | H04L 67/2852 707/999.101 |
| 7,548,908 B2 | 6/2009 | Fu et al. | |
| 7,620,781 B2* | 11/2009 | Breternitz, Jr. | G06F 12/0864 711/154 |
| 9,298,726 B1* | 3/2016 | Mondal | G06F 16/1752 |
| 2011/0307447 A1* | 12/2011 | Sabaa | H01L 67/2842 707/637 |
| 2014/0244779 A1* | 8/2014 | Roitshtein | H04L 45/748 709/213 |
| 2018/0060075 A1* | 3/2018 | Chou | G06F 9/3806 |
| 2018/0060593 A1* | 3/2018 | Abraham | G06F 21/6218 |

OTHER PUBLICATIONS

Gang He et al., Efficient Hashing Technique Based on Bloom Filter for High-Speed Network, 2016 8th International Conference on Intelligent Human-Machine Systems and Cybernetics (IHMSC), pp. 58-63, vol. 1, Dec. 2016.*
Mengyu et al., Bloom Filter Tree for Fast Search and Synchronization of Tree-Structured Data, 2016 IEEE 17th International Conference on Information Reuse and Integration, pp. 401-410, Dec. 2016.*
Wenliang Fu et al., Synchronizing Namespaces with Invertable Bloom Filters, 2015 ACM/IEEE Symposium on Architectures for Networking and Communications Systems (ANCS), pp. 123-134, May 2015.*

* cited by examiner

*Primary Examiner* — Greta L Robinson
(74) *Attorney, Agent, or Firm* — Kenneth Altshuler

(57) ABSTRACT

A centralized server, such as in a cloud environment, is provided generally connected to a plurality of clients that independently maintain data that is also maintained in the centralized server. The centralized server possessing an authoritative Bloom filter series comprising at least a plurality of Bloom filters each with successive Bloom filter entries that periodically provide and update a copy of the authoritative Bloom filter series at each of the clients. Each client checks to see if a data file is present locally by searching for a corresponding Bloom filter entry in the copy of the Bloom filter series before seeking the data file in the centralized server.

22 Claims, 22 Drawing Sheets

BLOOM FILTER SERIES

CROSS-REFERENCE TO RELATED APPLICATIONS

None

FIELD OF THE INVENTION

The present embodiments are directed to one or more rotating series of Bloom Filters.

DESCRIPTION OF RELATED ART

Cloud storage is becoming as ubiquitous as the computers that use it. Whether backup storage for a person's private cell phone, a laptop computer, or for a large company, cloud storage is changing the way people store and retrieve data. Cloud storage generally comprises one or more data servers, networks, storage, applications and services, etc. that pool storage resources accessible by a data consumer by way of the World Wide Web. Providers of cloud storage are tasked with keeping data available and accessible all of the time through maintenance and protection of a physical storage environment that is constantly running. Public cloud providers deliver scalable storage to multiple organizations through standardized cloud storage interfaces. The public cloud makes accessing data for thousands, if not millions, of users easy from essentially any location that has access to the Internet. Examples of public cloud storage providers include AWS (Amazon Wed Services) by way of the S3 interface, Dropbox, Google Drive, Microsoft Azure, Oracle Cloud, IBM's SmartCloud, just to name a few. The economic model behind public cloud storage is varied, but generally requires paying for the amount of data stored and the amount of data recalled and the speed of that recall. These charges are typically billed on a monthly basis. Though often public cloud storage providers offer a few gigabytes of storage in the cloud for free, their intention is to gain customers that desire to purchase larger amounts of storage capacity, hassle free. For that reason there are typically no upfront charges nor charges associated with moving data into the cloud. The public cloud offers many great advantages compared to on-premise storage by simply charging for by the amount of data retained in the public cloud and the amount of data accessed from the public cloud.

Some hybrid architectures envision a public cloud serving a network of private servers that use the public cloud as a central database with knowledge of the contents and status of the contents on each private server. As the network of private servers reaches critical numbers, back and forth traffic between the public cloud and the private servers consume bandwidth slowing down all communication. Slowing down communications because of high volume communications is a disadvantage for the hybrid architectures.

It is to innovations related to this subject matter that the claimed invention is generally directed.

SUMMARY OF THE INVENTION

The present embodiments generally relate to using a Bloom filter scheme, generally comprising one or more rotating series of Bloom Filters, that reduces traffic between a network of servers and a centralized server thereby enhancing the performance of communications between a network of servers and a centralized server, the centralized server acting as a centralized node to all of the network servers.

Certain embodiments of the present invention contemplate a centralized server adapted to manage an authoritative database and an authoritative Bloom filter series, the centralized server comprising: a plurality of data entries contained in the authoritative database, each of the data entries are subject to be altered with an updated data entry version; a plurality of generic identifiers each specific to one of the data entries, each of the generic identifiers remains constant even when one of the data entries is altered with an updated data entry version; the Bloom filter series comprising at least a first Bloom filter and a second Bloom filter, each of the Bloom filters comprising a plurality of registers configured to positively indicate when a representation of one of the generic identifier is present, each of the Bloom filters is configured to sequentially receive a Bloom filter entry of one of the representations every time one of the data entries is altered, the first Bloom filter is adapted to receive a maximum number of Bloom filter entries before the second Bloom filter receives any Bloom filter entries; a communication link to a first client, the first client configured to receive and maintain a copy of the Bloom filter series over the communication link, the copy of the Bloom filter series configured to furnish the client with knowledge of the updated data entry versions without requiring back and forth communications with the centralized server.

Yet, other embodiments of the present invention can therefore comprise a method of reducing network traffic and therefore improving network speeds using Bloom filter series, the method comprising: providing a centralized server with an authoritative database and an authoritative Bloom filter series, the centralized server linked with a network of clients; generating Y-data-1 and a generic Y-identifier paired with Y-data-1 in a first client of the network of clients, Y-data-1 is retained in a first client cache; transmitting the Y-data-1 and the generic Y-identifier from the first client to the centralized server; storing the Y-data-1 to the authoritative database; generating a first Bloom filter entry of the generic Y-identifier in a first Bloom filter of the authoritative Bloom filter series; storing, at each of the clients, a local Bloom filter series that is a copy of the authoritative Bloom filter series that includes the generic Y-identifier located in the first Bloom filter; at the first client, generating a Y-identifier pointer to the first Bloom filter entry in the copy of the first Bloom filter of the local Bloom filter series; altering the Y-data-1 to Y-data-2 at one of the clients; the one of the clients informing the centralized server of the Y-data-2; replacing the Y-data-1 with the Y-data-2 in the authoritative database; generating a second Bloom filter entry corresponding to the generic Y-identifier in a successive Bloom filter that is successive to the first Bloom filter of the authoritative Bloom filter series as a consequence of the Y-data-2; updating the local Bloom filter series with the second Bloom filter entry of the generic Y-identifier in a copy of the successive Bloom filter at each of the clients.

Yet further embodiments of the present invention contemplate a method of reducing network traffic using a Bloom filter series, the method comprising: providing a centralized server linked with at least one client, the centralized server possessing an authoritative database and an authoritative Bloom filter series that comprises a plurality of successive Bloom filters each defined by a successive range of entries; updating, at the client, a client Bloom filter series with the authoritative Bloom filter series; the client managing a generic identifier and having knowledge that a Bloom filter entry corresponding to the generic identifier is located in a first Bloom filter of the client Bloom filter series; searching in the client Bloom filter series for a later Bloom filter entry corresponding to the generic identifier in at least one successive Bloom filter to the first Bloom filter.

Other embodiments are directed to a storage arrangement comprising a method comprising: providing a centralized server linked to plurality of clients, the centralized server possessing an authoritative Bloom filter series comprising at least a plurality of Bloom filters each with successive Bloom filter entries; periodically updating a copy of the authoritative Bloom filter series at each of the clients; and at the client, checking to see if a data file is present at the client by searching for a corresponding Bloom filter entry in the copy of the Bloom filter series before seeking the data file in the centralized server.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of Bloom filters. In what follows, similar or identical structures may be identified using identical callouts.

A Bloom filter is a probabilistic data structure that efficiently identifies if a data element exists in a data set. For example, if a data set includes data elements "X", "Y", "Z" and "W" a Bloom filter can be used to quickly identify if one of the data elements exists in the data set without inspecting the entire data set. Simply put, a query to a Bloom filter of whether or not a data element exists in a target data set will indicate that the data element is either "definitely not in the set" or is "possibly in the set". A Bloom filter will indicate when matches are possible, called a "false positive" but "false negatives" are not possible. Elements can be added to the set, but not removed. The more elements that are added to a data set, the larger the possibility of a false positive.

Figure 1A:
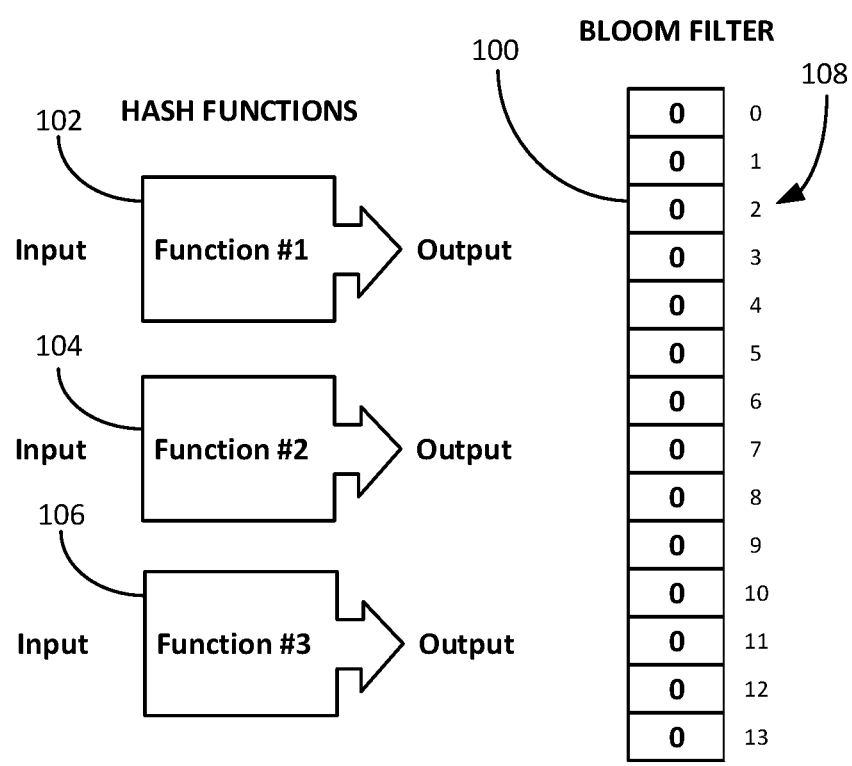
FIG. 1A diagrammatically depicts a Bloom filter consistent with embodiments of the present invention.

FIG. 1A depicts a diagram of a Bloom filter 100 consistent with embodiments of the present invention. As shown, the Bloom filter 100 is a bit array. Originally all bits set in the bit array are set to 0. In this example, there are hash function algorithms shown here as boxes "Function #1", "Function #2" and "Function #3". In this case the input would be a string of data in the output would be a small hashed bit function, in this case 0-13.

Figure 1B:
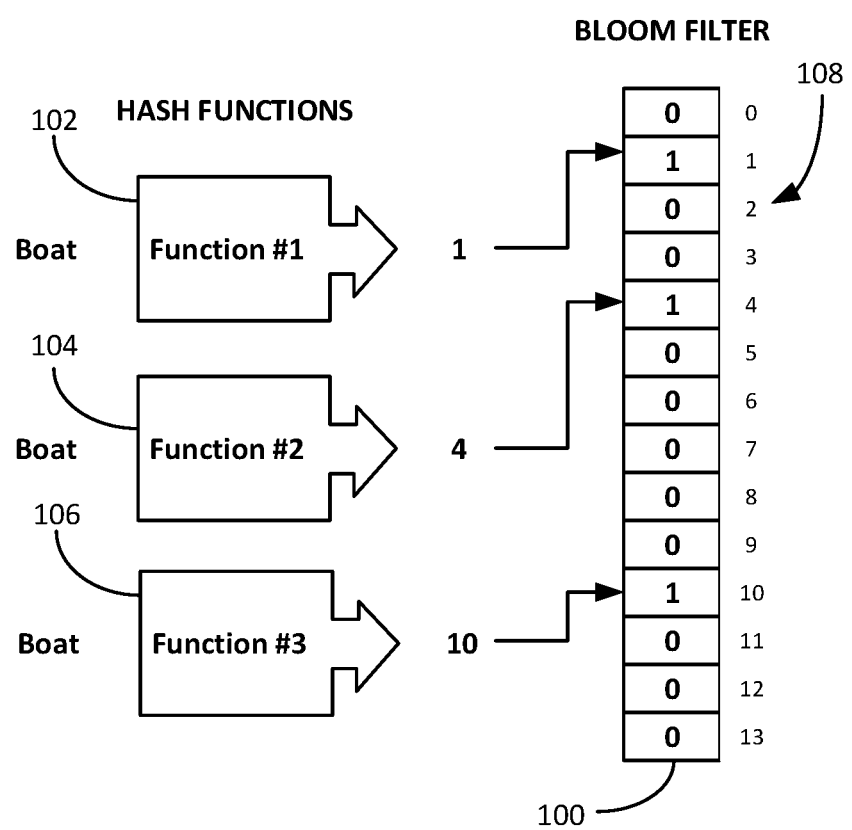
FIGS. 1B-1F diagrammatically depict examples of inputting data to a Bloom filter data set and validating data elements against the data set using the Bloom filter consistent with embodiments of the present invention.
Figure 1C:
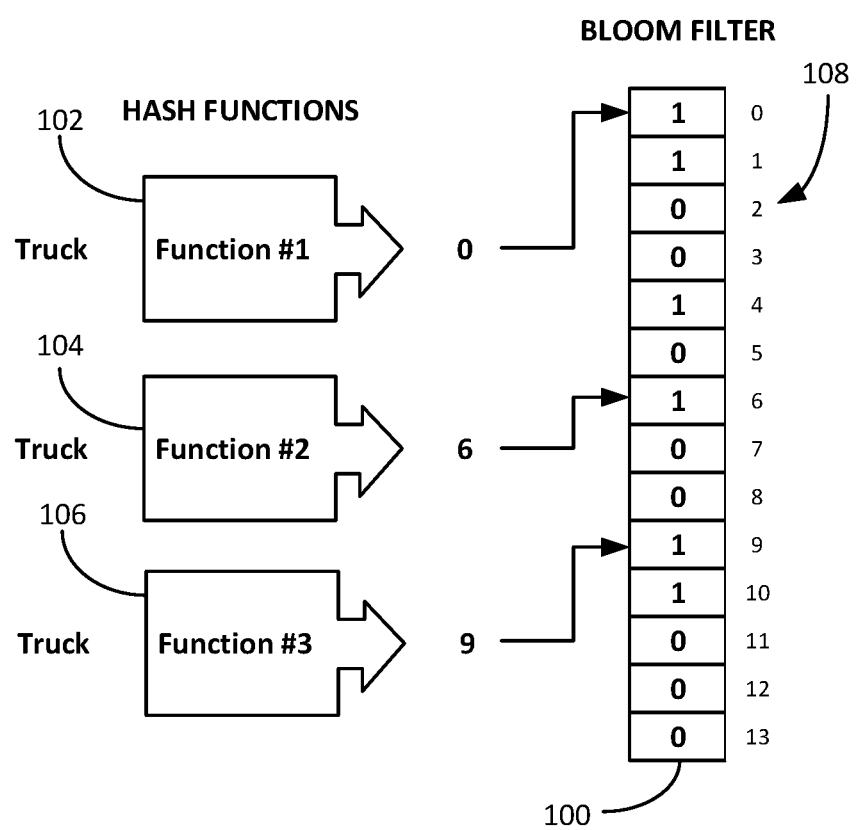
Figure 1D:
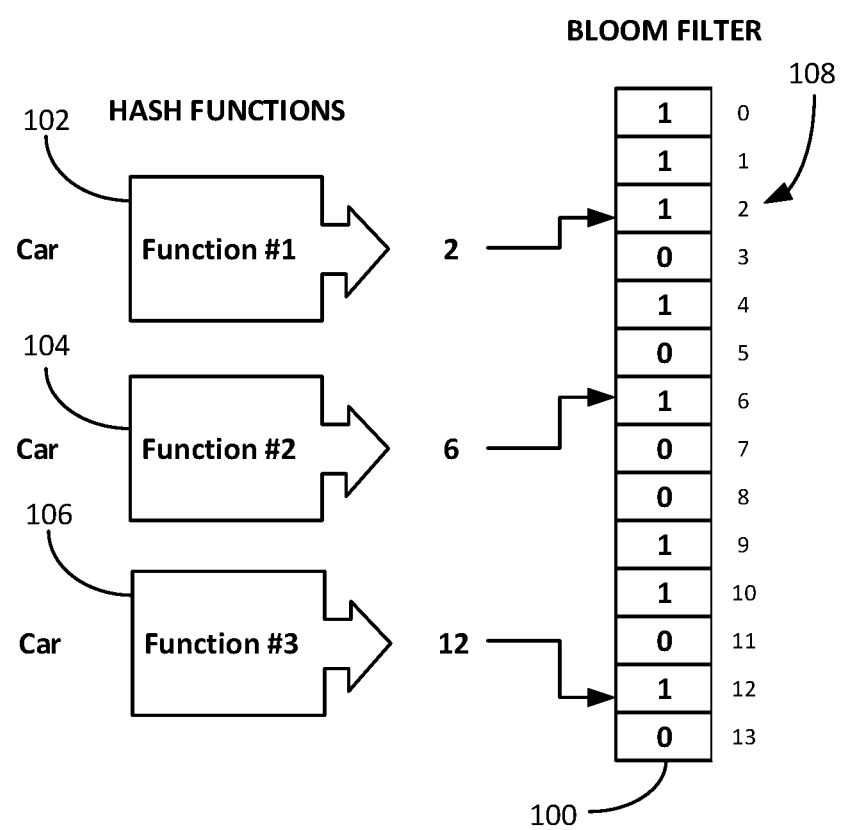

FIGS. 1B-1F diagrammatically depicts examples of inputting data in a data set comprised of vehicles, such as Boat, Truck and Car and checking the data set with other elements to see if the other elements are included in the data set. As shown in FIG. 1B, the word "Boat" is inputted in hash function #1 and outputted with the number 1. Accordingly, register 1 is set from the "0" bit to a "1" bit. Likewise, function #2 converts "Boat" to the number 4 thus toggling register 4 from the "0" bit to a "1" bit. And, function #3 converts "Boat" to the number 10 thus toggling register 10 from the "0" bit to a "1" bit. Hence, the Bloom filter 100 has registers 1, 4 and 10 set (toggled in this case) to a "1" bit. As shown in FIG. 1C, the word "Truck" is inputted in hash function #1 and outputted with the number 0, function #2 converts "Truck" to the number 6, and function #3 converts "Truck" to the number 9. Accordingly, registers 0, 6 and 9 are all set from the "0" bit to a "1" bit. Hence, the Bloom filter 100 now has registers 0, 1, 4, 6, 9 and 10 set to a "1" bit. As shown in FIG. 1D, the word "Car" is inputted in hash function #1 and outputted with the number 2, function #2 converts "Car" to the number 6, and function #3 converts "Car" to the number 12. Accordingly, registers 2, 6 and 12 are all set from the "0" bit to a "1" bit. Hence, the Bloom filter 100 now has registers 0, 1, 2, 4, 6, 9, 10 and 12 set to a "1" bit.

Figure 1E:
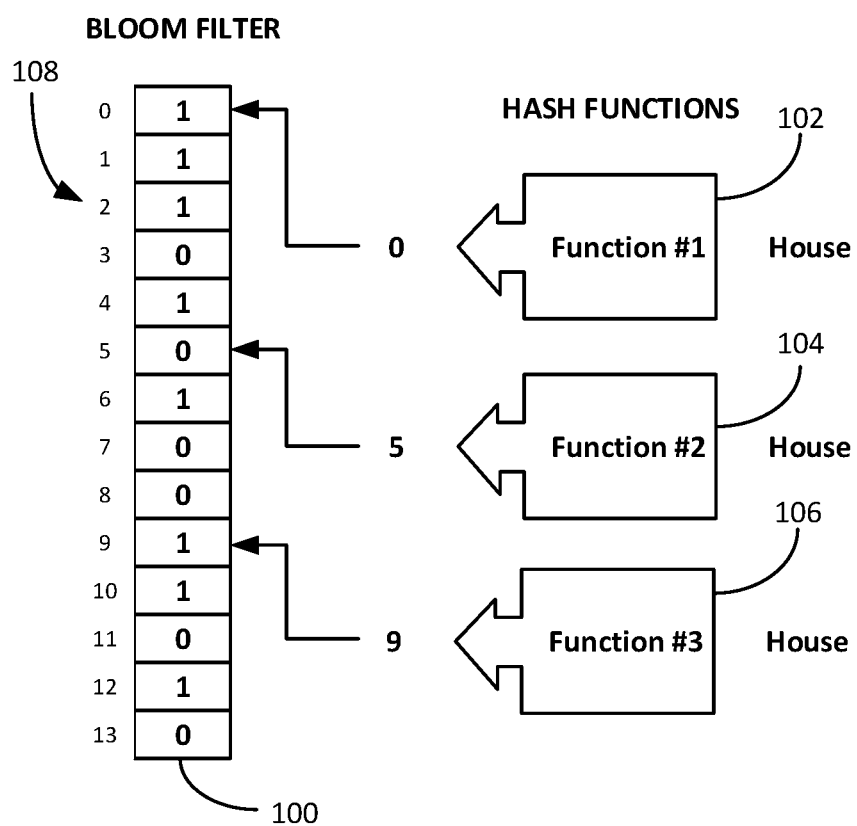

FIG. 1E diagrammatically depicts an example of checking the data set [Car, Boat, Truck] with other data elements to see if the other data elements are included in the data set consistent with embodiments of the present invention. In shown here the data element is "House". The word "House" is inputted in hash function #1 and outputted with the number 0, function #2 converts "House" to the number 5, and function #3 converts "House" to the number 9. As can be readily seen, the Bloom filter 100 clearly indicates that "House" is not in the data set because register 5 is still a 0. This is an example of a data element (House) that is definitely (100% surety) not in the data set.

Figure 1F:
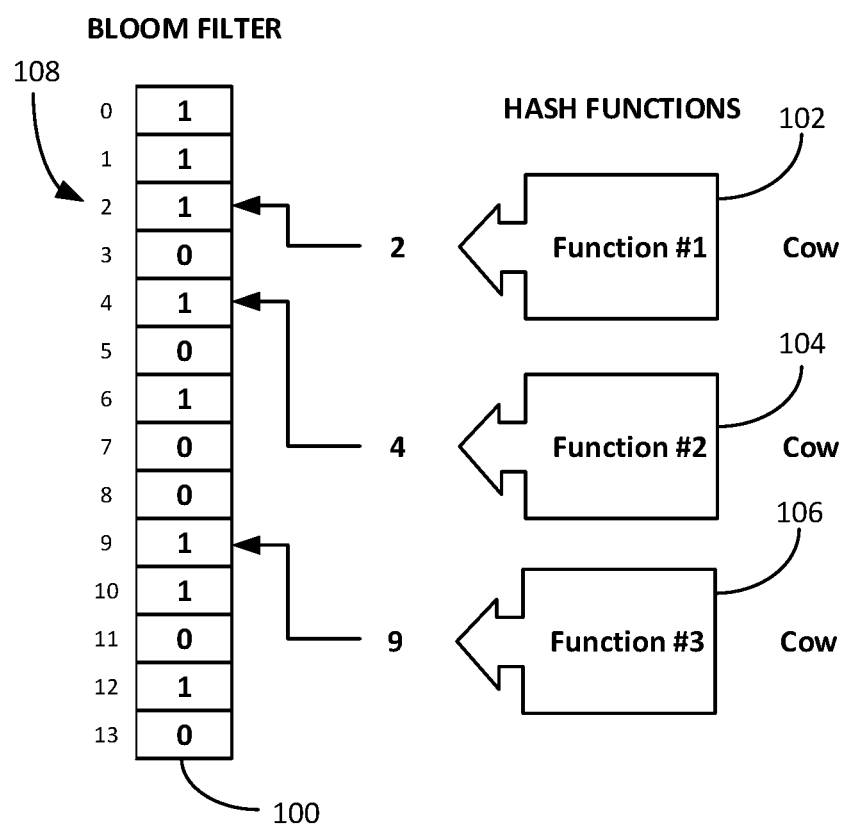

FIG. 1F diagrammatically depicts an example of checking the data set [Car, Boat, Truck] with another data element to see if the other data element is included in the data set consistent with embodiments of the present invention. In shown here the data element is "Cow". The word "Cow" is inputted in hash function #1 and outputted with the register number 2, function #2 converts "Cow" to the register number 4, and function #3 converts "Cow" to the register number 9. As can be readily seen, the Bloom filter 100 indicates that "Cow" is likely in the data set because all of the registers of interest are set with a "1", but in this example "Cow" is a false positive result. As will be appreciated by one skilled in the art, the more registers set to a "1", the greater the chance of a false positive conclusion. This is an example of a data element (Cow) that is not in the data set even though based on the Bloom filter "Cow" would appear likely in the data set.

Figure 2:
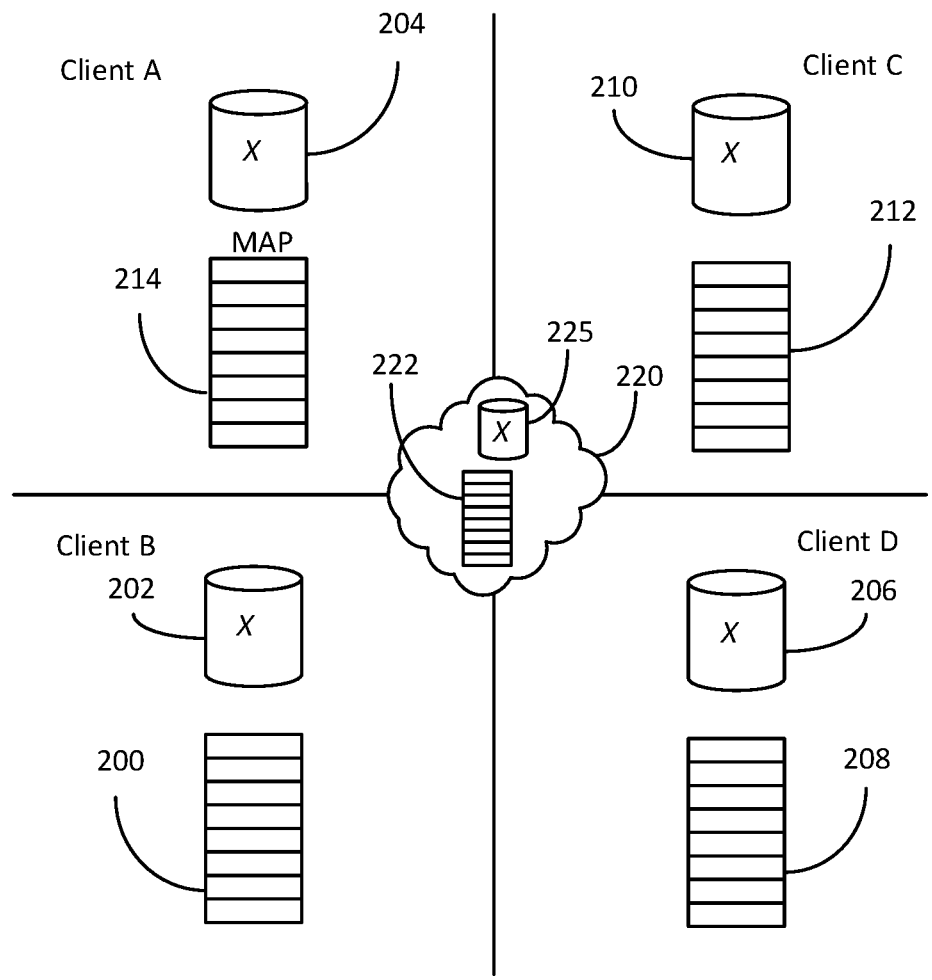
FIG. 2 depicts a block diagram of a plurality of clients each with a Bloom filter actively linked with a central server also possessing a Bloom filter consistent with embodiments of the present invention.

FIG. 2 depicts a block diagram of a plurality of clients (clients possess storage devices (HDDs, SSDs, and the like), software, computing processors, power and known elements that make up a client server known to those skilled in the art) each with (retained in local storage) a Bloom filter actively linked (Ethernet, Fiber and the like including the appropriate protocol/s, routers and other hardware and software presently used today and known to those skilled in the art) with a central server (also possessing the computing devices, storage and other elements known to those skilled in the art), or in certain embodiments a cloud computing service, also possessing a Bloom filter consistent with embodiments of the present invention. As shown, Client A possesses local cache memory 204 and a local Bloom filter system 214. The local Bloom filter system 214 is arranged to sync with the Bloom filter system 222 in the server 220. Likewise, Client B possesses a local Bloom filter system 200 that is arranged to sync with Bloom filter system 222 in the server 220. Client B also possesses a local cache memory 202. Client C possesses local cache memory 210 and a local Bloom filter system 212. Client C's local Bloom filter is also arranged to sync with the Bloom filter system 222 in the server 220. And finally, Client D possesses local cache memory 206 and a local Bloom filter system 208 that is also arranged to sync with the Bloom filter system 222 in the server 220. It should be appreciated that though four clients are depicted in FIG. 2, there could be an unlimited number of clients linked with the server 220.

For example, assume Client A is seeking an entry "$X_1$" from the authoritative database 225. The authoritative database 225, in this example, contains the data-file "$X_1$", that is "$X_1$" is retained in storage devices (e.g., HDDs, SSDs, and similar devices operably used to retain or otherwise store data and dispense data) that comprise the authoritative database 225. Once located, Client A will also store "$X_1$" locally in cache 204 (the version "1"-"$X_1$" can be metadata, authorization data, user data, user authentication data, encryption keys, access control, caching locations, users and groups, etc.). An example of a version of a file is a file, such as "X", that is altered by at least a single bit. In this example, the different versions of the file, "X", all comes from a common original file. Further assume all the other Clients (B, C and D) store "$X_1$" in their respective local cache memories 202, 206, 210 as well. If at a later time "$X_1$" gets changed to "$X_2$" (version number 2), the server 220 needs to update all the other Clients that "$X_1$" was changed to "$X_2$" so not to use the local cached value of "$X_1$". A simple way to communicate this change is for the server 220 broadcast that "$X_1$" is no longer valid to each of the Clients. This solution is a reasonable approach when there are only a few Clients, but when there is a large unbounded number of Clients (for example 10 or perhaps 100 Clients), the traffic to accomplish communicating to each Client becomes very time-consuming (e.g., for 100 Clients the write amplification becomes 99). Approaching this problem by using a Bloom filter dramatically decreases the communication traffic because a filter will contain many invalidations, whereas a broadcast would be one invalidation at a time.

Figure 3A:
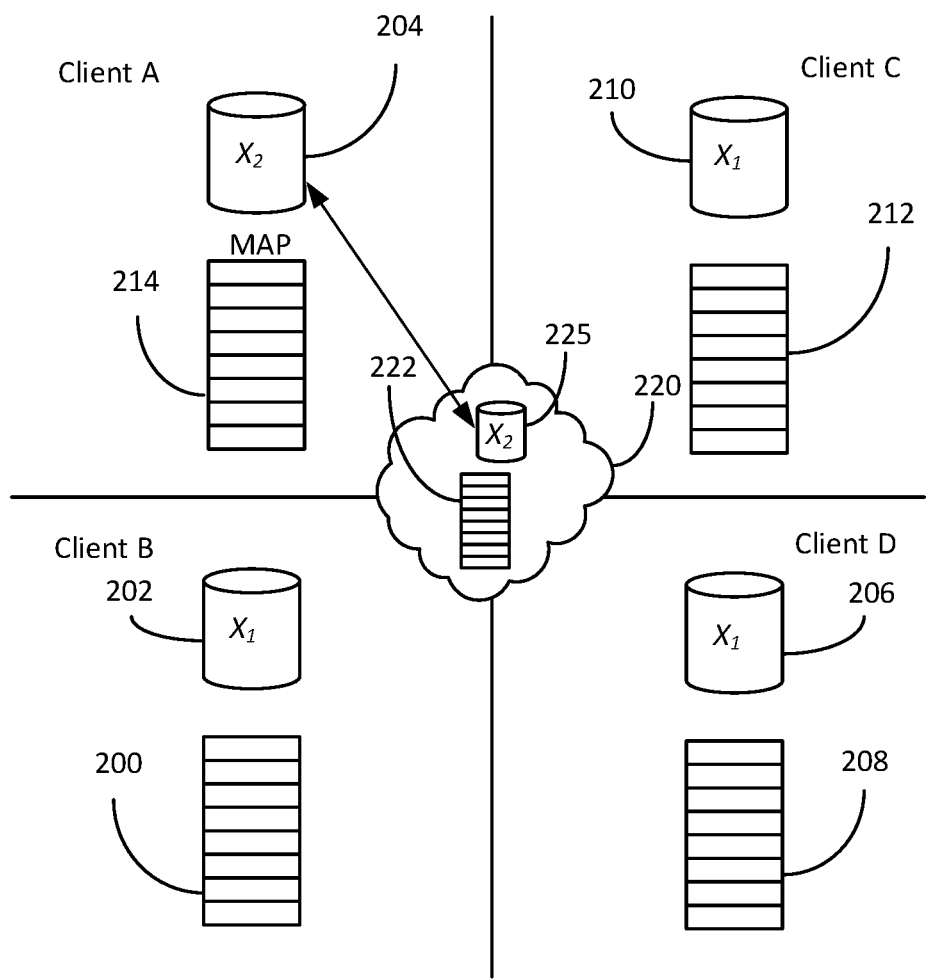
FIG. 3A-3C depicts a block diagram of steps involved in using a Bloom filter consistent with embodiments of the present invention.
Figure 3B:
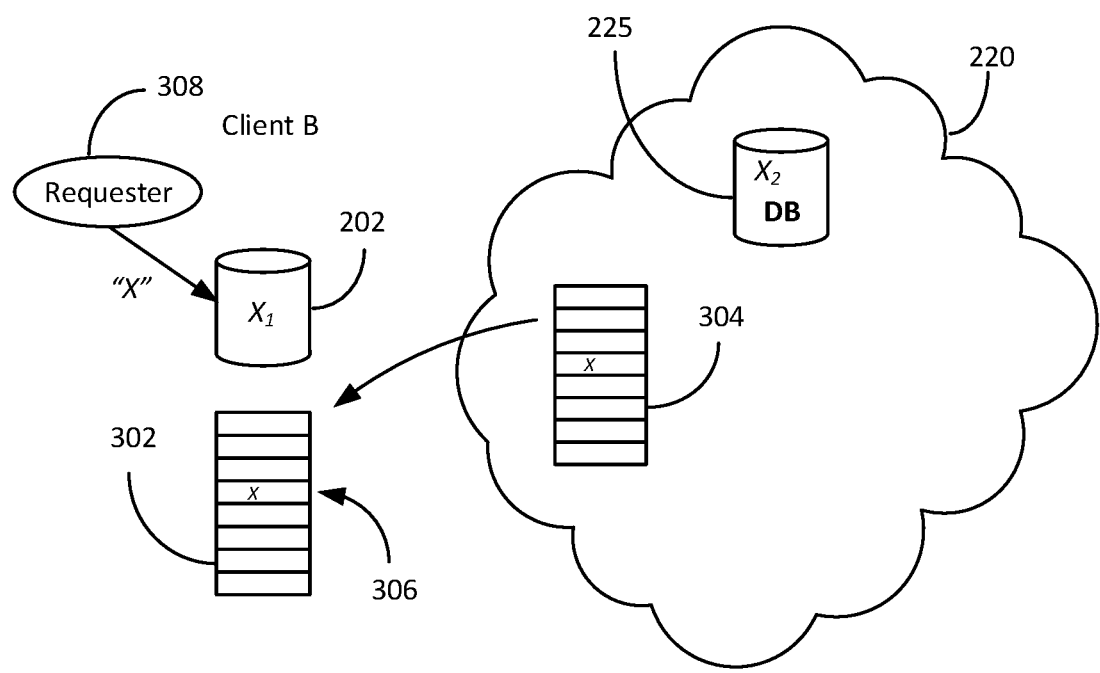
Figure 3C:
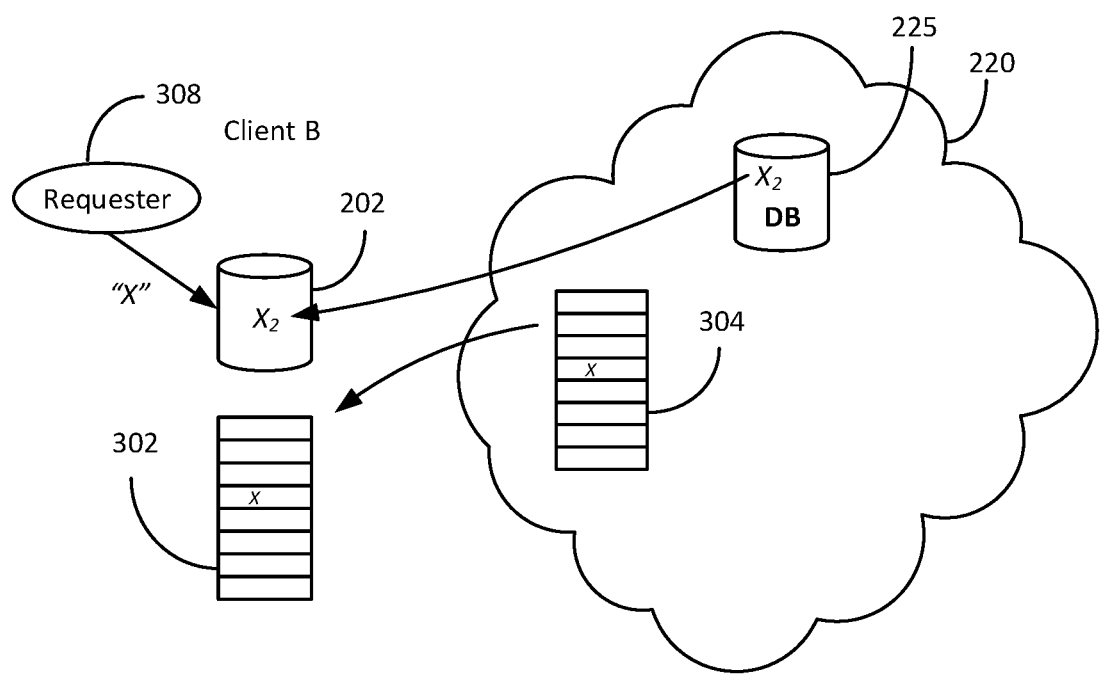
Figure 4:
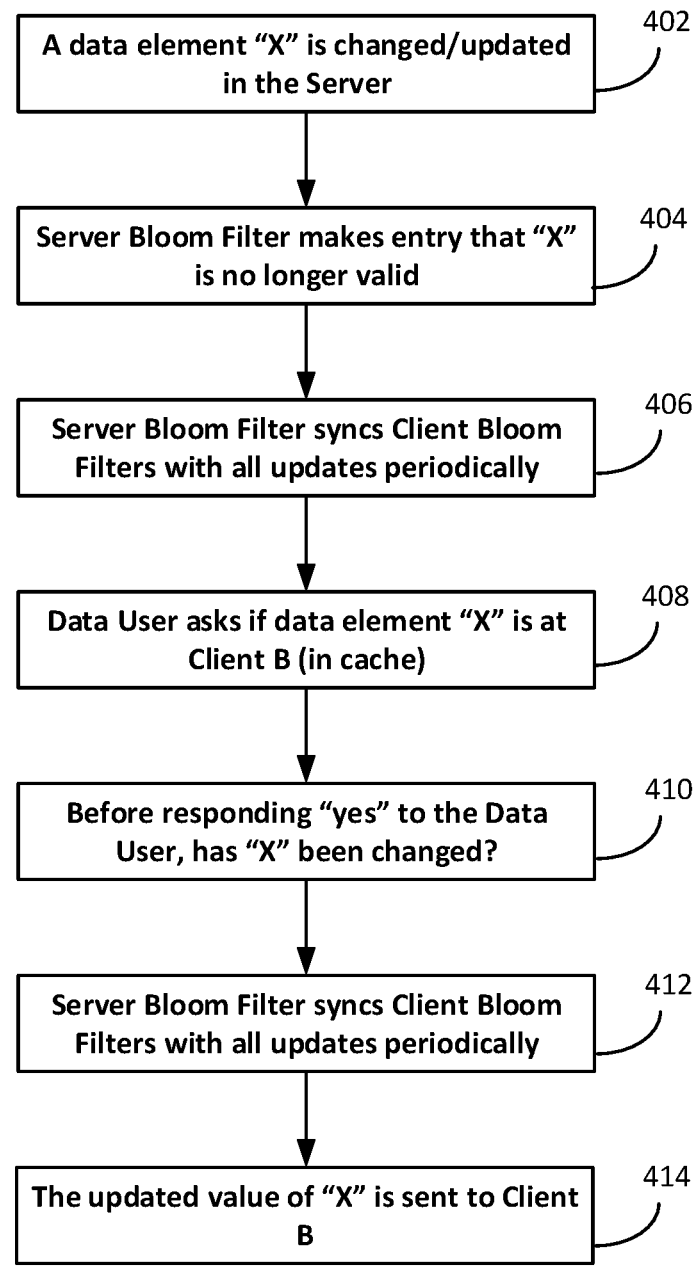
FIG. 4 is a block diagram of method steps describing FIG. 3A-3C consistent with embodiments of the present invention.

FIGS. 3A-3C depict a block diagram of steps involved in using a single Bloom filter to sub-optimally decrease communication traffic between Clients and a server when updating a local cache consistent with embodiments of the present invention. FIGS. 3A-3C are shown in view of FIG. 4 method block diagram steps. As shown in FIG. 3A, assuming data element "$X_1$" was changed to "$X_2$" by Client A, the authoritative database 225 is updated with "$X_2$", step 402. Some embodiments contemplate that the data element "$X_1$" and "$X_2$" and for that matter "$X_N$" are all paired with a generic X-identifier (just "X" with no version number in subscript) which is a key to whatever version of "$X_N$" exists. For example, data element "$X_N$" may have a title "X" (the generic X-identifier) and even though the version of data element "$X_N$" may change, the title "X" stays the same, hence the term "generic identifier". To illustrate this example, imagine an end user initially stores their data file to a client and calls that file "END-USER FILE". "END-USER FILE" is the generic identifier (or name of the file) and because it is the initial version, it will be denoted as version 1, or in context to the above use of "$X_1$", "END-USER FILE$_1$". Even though there can be many versions of "END-USER FILE", the name "END-USER FILE" remains the tag/identifier for the data file. The Bloom filter in the Server 220 is updated with an entry of "X" in the latest Bloom filter register indicating that "$X_1$" is no longer valid, step 404. Periodically (such as every minute), the Server 220 syncs, or updates, the Bloom filters in each of the Clients, 406. Optionally, Clients will "pull" updates to the Bloom filter 302 from the Server 220 when necessary. Accordingly, the updated version of the Bloom filter 302 in Client B has a Bloom filter entry "X" indicating that "$X_1$" is no longer valid 306, and therefore not to use the local cached value of "$X_1$" in Client B.

FIG. 3B illustratively depicts handling a request for (the value of) "X" in Client B consistent with embodiments of the present invention. As shown by the arrow with the "X", a Requestor 308 (a user of data) asks Client B for "X" and whether or not "X" is in Client B cache 202, step 408. Client B may or may not be interested in the particular version of "X", but rather may simply be interested in the latest version "X". Client B identifies that "$X_1$" is in the cache 202, but checks the updated local Bloom filter 302 to see if "$X_1$" has been changed and quickly discovers that "$X_1$" is now invalid, step 410. As shown in FIG. 3C, because "$X_1$" is invalid, "$X_1$" is removed from the local cache 202 and replaced with "$X_2$" from the authoritative database 225, step 412. The updated value of "$X_2$" is then sent to the Requestor, step 414. Certain embodiments contemplate that if the Requestor 308 asks Client B for the value of "X" and Client B determines that the local Bloom filter 302 has not been updated for a predetermined amount of time, such as one minute for example, an updated Bloom filter is pulled from the authoritative database 225. In other words, upon determining the local Bloom filter 302 is "old", the local Bloom filter 302 cannot be trusted, hence an updated Bloom filter is pulled from the authoritative database 225. Ultimately, assuming that the local Bloom filter 302 is updated, Client B can determine if a data element has not been altered with 100% accuracy and can determine if a data element has been altered with high accuracy (such as 99%) depending on the size of the Bloom filter.

In circumstances where "$X_1$" has been updated to "$X_2$" in Client B's local cache and yet the local Bloom filter 302 retains an "outdated" entry that "$X_1$" is invalid, the Server 220 can delete the entry "$X_1$" from the Server Bloom filter 222 in what is called a counting Bloom filter. In this scenario, a counting Bloom filter would transmit the updated version of the Bloom filter with the deleted entry to the Clients. The downside of deleting an entry is that the counting Bloom filter is no longer 100% free of a false negative. In other words, there is a chance of both a false negative and the false positive.

Similarly, in circumstances where "$X_1$" has been updated to "$X_2$" in Client B's local cache and yet the local Bloom filter 302 retains an "outdated" entry that "$X_1$" as invalid, "$X_2$" will look like it too is invalidated. Accordingly, "$X_2$" will be stored with the timestamp whereby after the timestamp expires "$X_2$" will simply be purged from the local cache and replaced with whatever version of "$X_N$" is in the authoritative database. The local Bloom filter too may have a time stamp where it will be replaced with the Server's Bloom filter that has the old "X" entry removed. In other words, when "$X_2$" become stale, such as an excess of amount of time elapsed since the local cache and the local Bloom filter were last updated (e.g., 10 minutes), "$X_2$" is purged from the local cache that replaced with whatever version of "$X_N$" is in the authoritative database. Accordingly, the local Bloom filter is replaced with the Server's Bloom filter with the deleted version of the old "X" and sent to all of the Clients. In this scenario, whatever version of "X" is in the local cache has a "time to live" in the local cache before getting purged and replaced with the cost of inefficiently sending updates to all the Clients and the possibility of a false negative.

Figure 5:
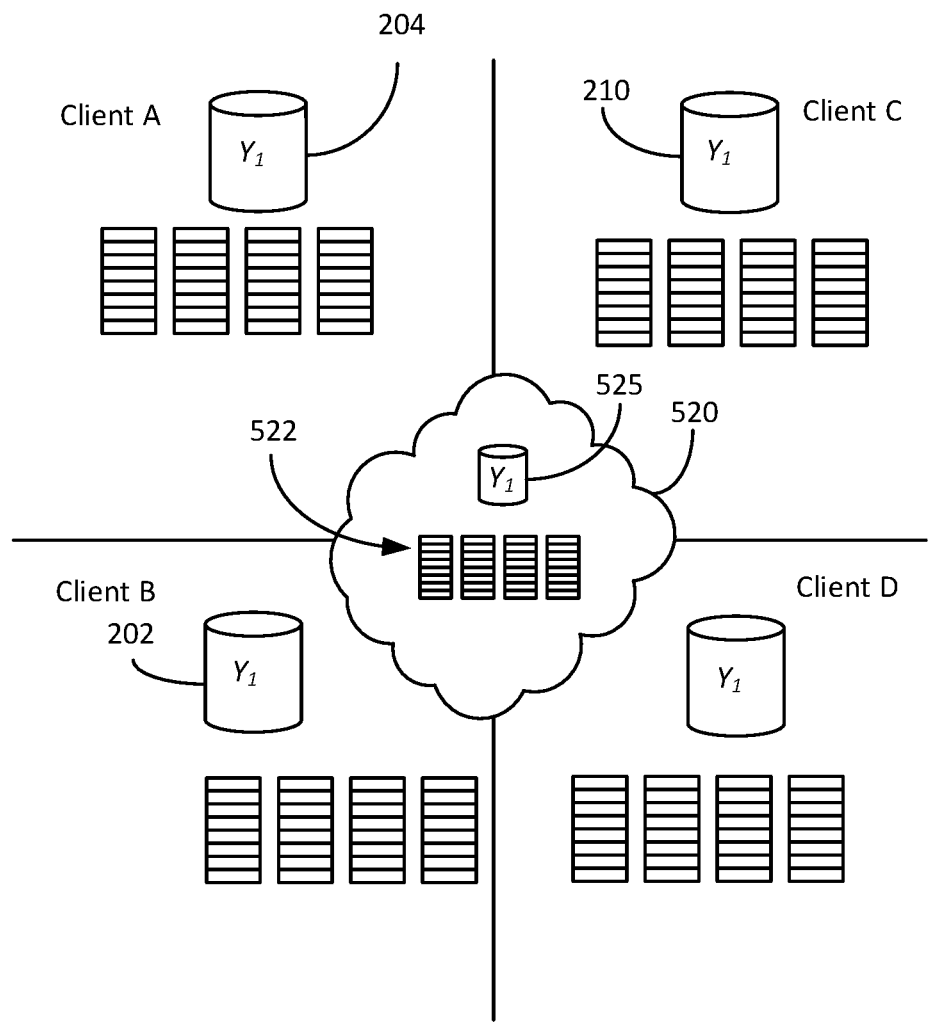
FIG. 5 depicts a block diagram of a generation Bloom filter series in accordance with embodiments of the present invention.

FIG. 5 depicts a block diagram of a generation Bloom filter system (Bloom filter series) to improve decreasing communication traffic between Clients and a server over that described in FIGS. 3A-3C in accordance with embodiments of the present invention. In this embodiment, a series of Bloom filters are provided each within a generation range. Hence, if an entry is made or changed in the authoritative database 525, the Bloom filter generation series 522 is sequentially increased with an entry reflecting the change. Each Bloom filter provides for a maximum allocation of generations before a new Bloom filter is created. The old Bloom filter is kept.

Figure 6A:
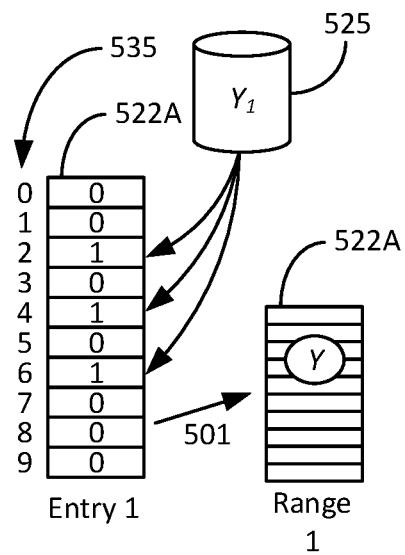
FIGS. 6A-6C depict a block diagrams of a plurality of Bloom filter entries and Bloom filter ranges consistent with embodiments of the present invention.
Figure 6B:
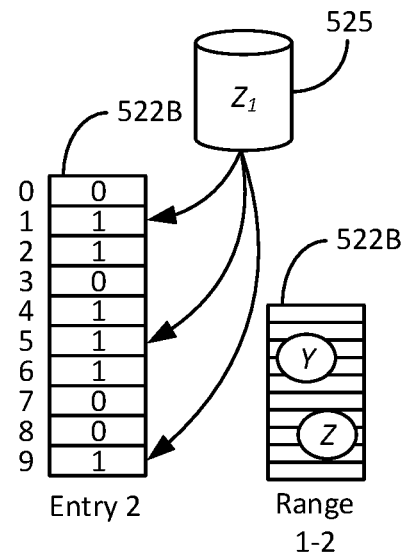
Figure 6C:
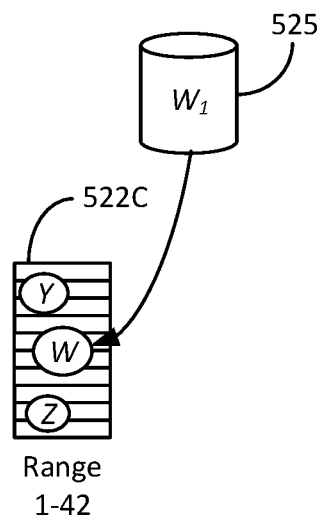

FIGS. 6A-6C depict a block diagrams of a plurality of Bloom filter entries and Bloom filter ranges as viewed in conjunction with FIG. 5 consistent with embodiments of the present invention. As shown in FIG. 6A, an initial data entry "$Y_1$" is entered in the Server 522 (of FIG. 5) and retained by the authoritative database 520 (of FIG. 5) by one of the plurality of Clients accessing the Server 522 (of FIG. 5). The initial entry "Y" is hashed (or conditioned some other way) through three hash functions yielding 2, 4, and 6. The registers 2, 4, and 6 in the Bloom filter 522A are then set from "0" to "1" marking the "Y" entry. A condensed version of Bloom filter 522A is depicted with just a "Y" in an ellipse for reference, see arrow 501. The condensed Bloom filter 522A has a range of 1 meaning it is a single entry. FIG. 6B shows a new entry "$Z_1$" entered in the authoritative database 520 by one of the plurality Clients and mapped to the Bloom filter 522B by setting registers 1, 5, and 9. The second entry Bloom filter 522B is depicted in condensed form with a "Y" and a "Z" in respective ellipses. FIG. 6C depicts a 42nd entry made to the Bloom filter 522C in condensed form with an entry "$W_1$" in an ellipse. The 42nd entry Bloom filter means that there have been 42 Bloom filter entries in the same Bloom filter 522 from the authoritative database 525.

Certain embodiments contemplate setting a limit for the number of entries of a Bloom filter before moving on to a new Bloom filter (and keeping the old one, at least for a while). Optionally, other embodiments contemplate setting a desired false-positive rate, which is relatively quick to estimate. As a skilled artisan will appreciate, a Bloom filter can become saturated with entries wherein most of the registers are set to a "1". As the registers become filled with "1's" the likelihood of a positive result from inquiring if an entry is in the Bloom filter increases even if the entry has not actually been made. This is an example of a false positive. Hence, false positive errors for entry evaluations increases as the Bloom filters become full. By setting a limit of entries for a Bloom filter before moving on to a new Bloom filter, false positives are held to an acceptable level.

Figure 7:
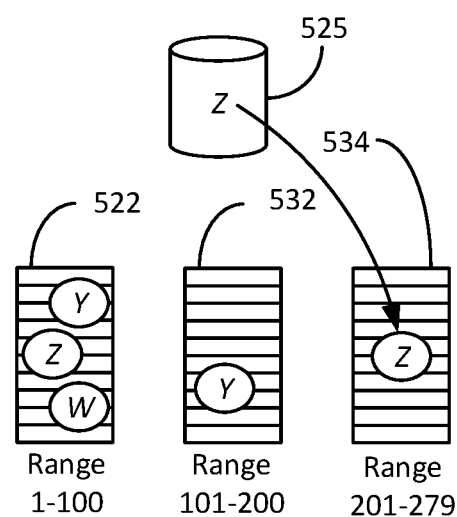
FIG. 7 depicts a block diagram of three series of Bloom filters with ascending ranges consistent with embodiments of the present invention.

FIG. 7 depicts a block diagram of three series of Bloom filters with ascending ranges consistent with embodiments of the present invention. The Bloom filters in the present example are arranged to contain 100 entries (or some other range number either set by an operator or automatically calculated) before starting a new Bloom filter. The first Bloom filter 522 spans the range of 1-100 entries and has data entries including "Y", "Z" and "W".

Figure 8A:
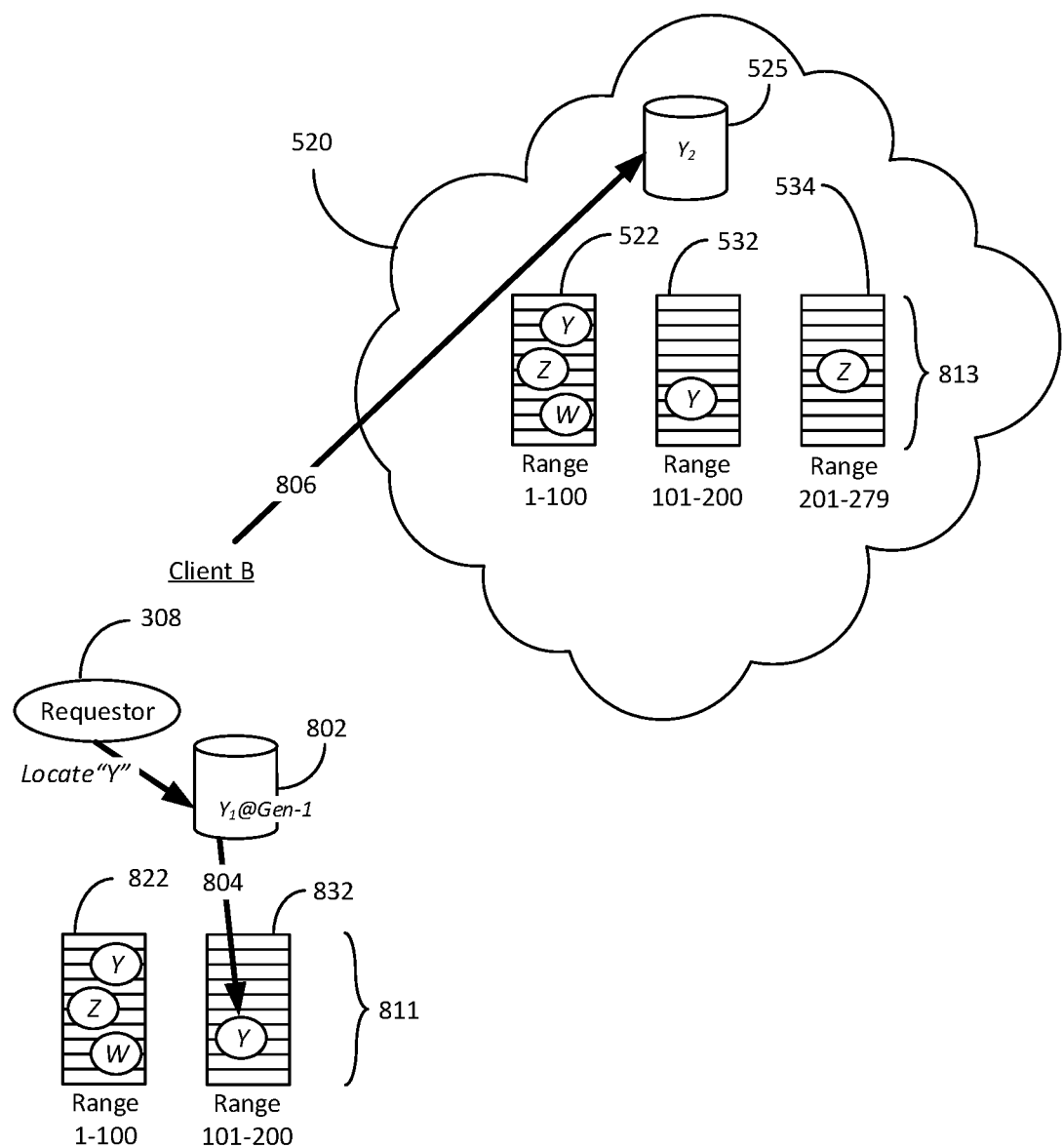
FIGS. 8A and 8B depict a block diagrams of utilizing Bloom filter series embodiments consistent with embodiments of the present invention.
Figure 8B:
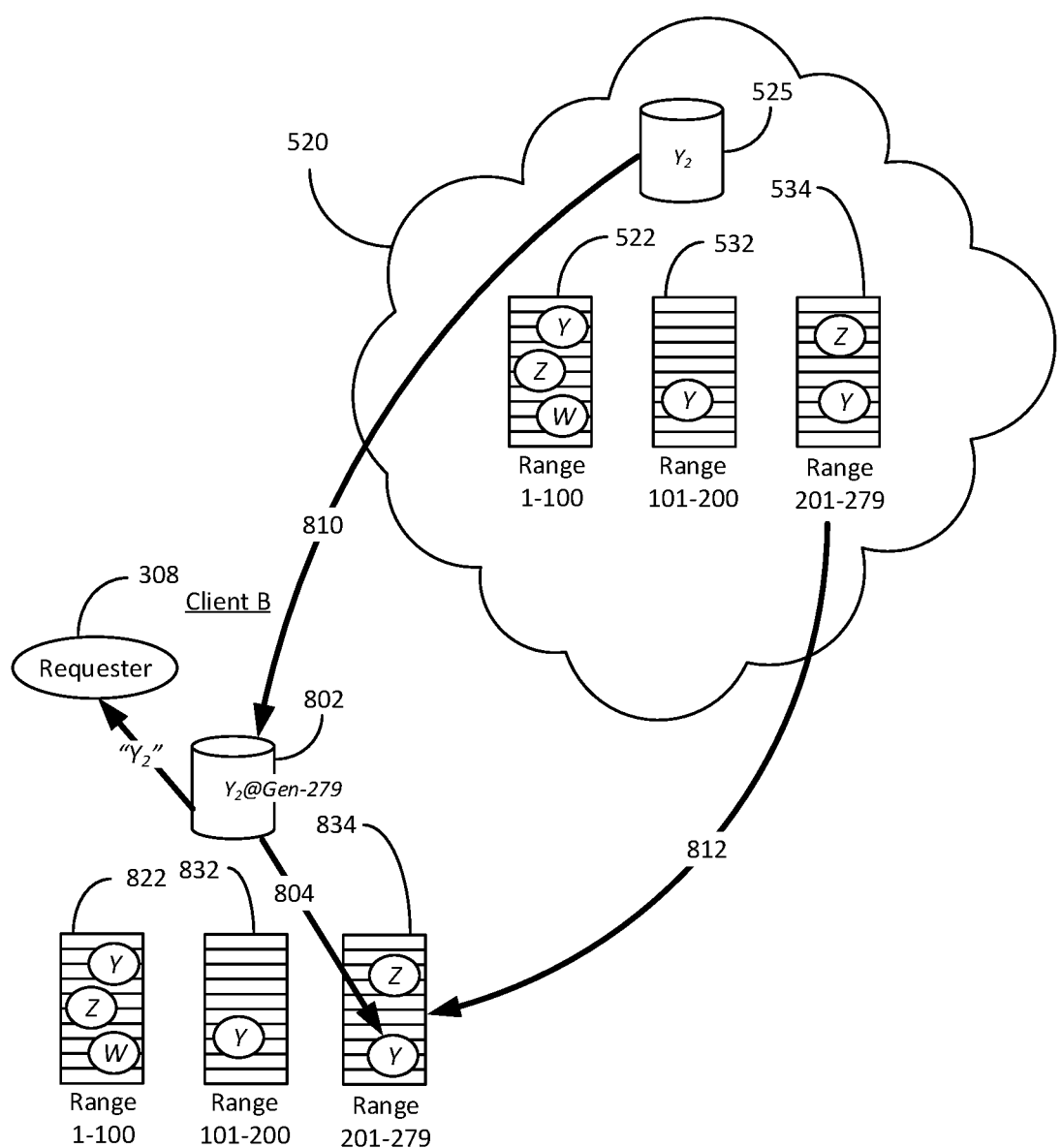
Figure 8C:
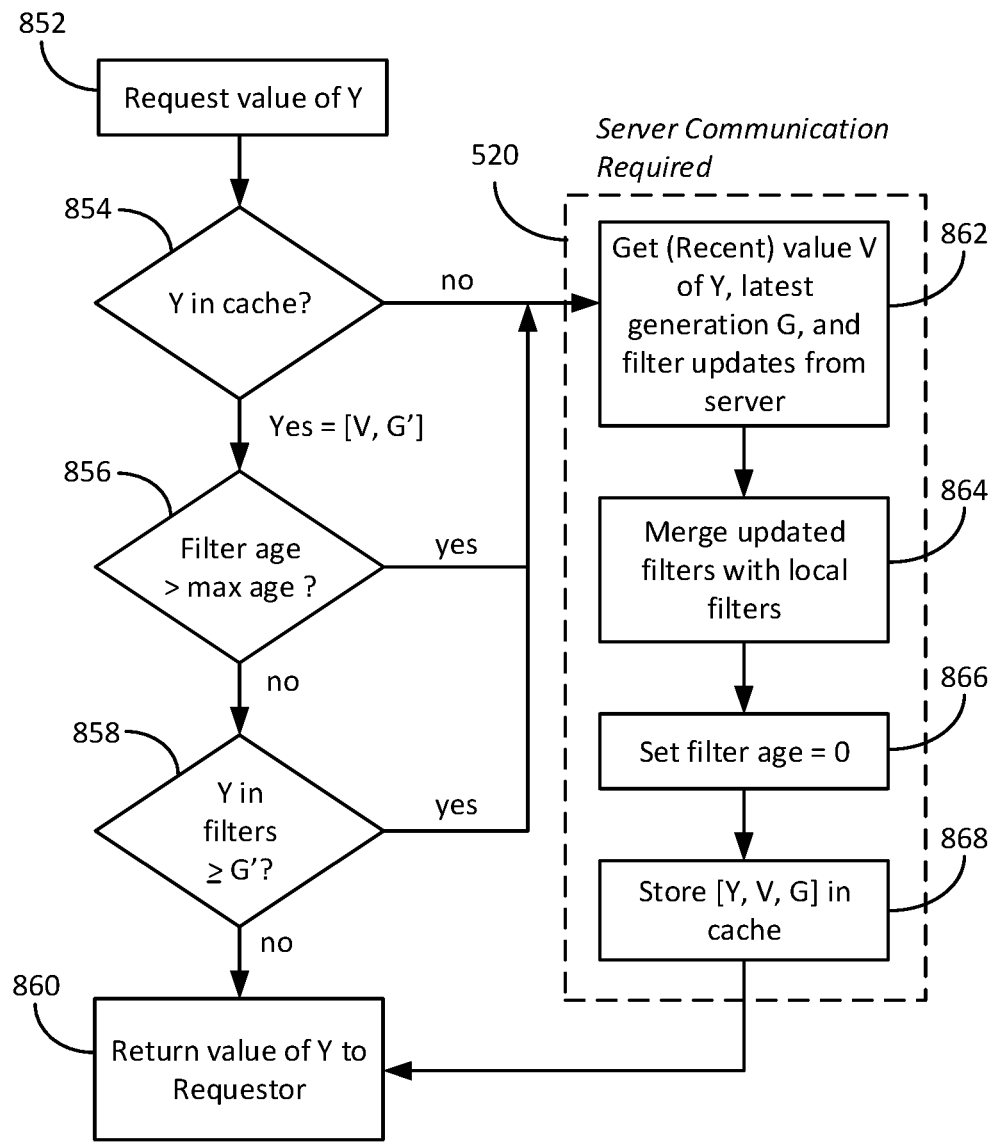
FIG. 8C is a block diagrams of method steps described in FIGS. 8A-8B consistent with embodiments of the present invention.

FIGS. 8A and 8B depict a block diagrams of utilizing Bloom filter series embodiments consistent with embodiments of the present invention. FIGS. 8A and 8B continue with the Server Bloom filters 522, 532 and 534. FIGS. 8A and 8B are in view of method block diagram steps shown in FIG. 8C. FIG. 8C is a method illustrating steps described in FIGS. 8A-8B consistent with embodiments of the present invention.

Initially, as shown in FIG. 8A and step 852, a Requestor 308 interrogates Client B to locate data element "Y". As further shown, Client B only has two Bloom filters 822 and 832 while the Server 520 has three Bloom filters 522, 532 and 534 because Client B is not quite up to date with the Server's authoritative Bloom filters 522, 532 and 534. The authoritative Bloom filters 813 contains, or otherwise possesses in the authoritative Bloom filter series 813, a plurality of Bloom filter entries reflecting the data entries contained (retained/stored) in the authoritative database 525. Client B looks to see if data-element-Y is in the local cache, decision step 854. If "yes" proceed to decision step 856, which asks if the local Bloom filter 811 at Client B is up to date with the authoritative Bloom filter 813 within a preset threshold a) Client B checks to see if the generic Y-identifier "Y" (what is the value?) and the known generation of data-element-Y, or simply "$Y_N$", which in this case is "$Y_1$" at the Gen-1 Bloom filter 822, and b) Client B checks to see if the local Bloom filter series 811 been updated within a predetermined amount of time since last updating. For example, if the predetermined amount of time is set to one minute for updates to the local Bloom filter series 811 from the authoritative Bloom filter series 813 and more than one minute has passed since a last update then sync, or update, the local Bloom filter series 811 with the authoritative Bloom filter series 813. In this way, the local Bloom filter series 811 is acceptably up-to-date and substantially accurate. In the present embodiment, "acceptably" up-to-date is envisioned to mean that there is some chance an updated entry will be missed in the local Bloom filter 811 (yet present in the authoritative Bloom filter 813), however "substantially" is envisioned to mean that the chance an entry will be missed is tolerably low. Accordingly, in the present case, a predetermined amount of time being set to one minute can be determined through statistical analysis, some other mathematical means, or simply by guesswork. The predetermined amount of time in one embodiment is set to a level deemed acceptable by an authority over Client B. Back to the decision step 856, if "no", meaning the filter age did not exceed the threshold for a predetermined amount of time proceed to decision step 858.

With continued reference to step 858, Client B searches the local Bloom filter series 811 for a Bloom filter entry "Y". In certain embodiments, Client B only searches in successive local Bloom filters (e.g., local Bloom filter 832) from the local Bloom filter corresponding to the known "Y-Generation", in this case "$Y_1$". In other words, Client B does not search in local Bloom filter range 1-100 (entries), rather searches in local Bloom filter range 101-200 and beyond. If decision step 858 is "no", then return data-element-Y, or value of data-element-Y, to the Requestor 308, step 860.

Returning to decision block 854 if data-element-Y is not in the local cache 802 then communication with the server 520 is required—proceed to block 862. If decision block 856 is "yes" then communication with the server 520 is required—proceed to block 862. If decision block 858 is "yes" then communication with the server 520 is required—proceed to block 862. In all of these three cases, dealing with the Requestor 308 cannot be done locally in Client B requiring communication bandwidth consumption with the server 520. At the server 520 step 862 get the most recent value of "$Y_N$" and sync the authoritative Bloom filter with the local Bloom filters, in this case Client B, step 864. Set the local Bloom filter age to zero, effectively resetting the clock on the predetermined amount of time to "pull" an update from the server 520. In certain embodiments, set a clock on the authoritative Bloom filter age to zero so there can be up "push" of the authoritative Bloom filter on all of the client Bloom filters when the/a predetermined amount of time is reached. At the Client B's cache 802 store the new value of "$Y_2$" tagged with Gen-279, step 868.

As shown in this scenario in FIG. 8A, Client B's local cache 802 only possesses the version of "$Y_1$" at Gen-1 (first entry) denoted herein as "$Y_1$@Gen-1", step 854, following a request from the Requestor 308, step 852. In this example, data-element "$Y_1$" is a data file, such as an access file, meta data or some other file. Accordingly, Client B will look in all Bloom filters newer than (after) the range 1-100 to see if there is a positive hit for the generic identifier "Y" (i.e., find if the local value of "Y" been invalidated by an update), step 858, assuming that the local Bloom filter series age has been updated within the preset time limit, step 856. In one embodiment, Client B skips the first Bloom filter 822 and interrogates all later Bloom filters (in this case the second Bloom filter 832) to see if "Y" has been updated/altered (arrow 804) because Client B already knows there will be a hit in the first Bloom filter 822. Nonetheless, the second local Bloom filter 832 (spanning the range of 101-200 entries) has a data entry hit for "Y", "yes" decision in step 858. The reason that "Y" is in the updated Bloom filter 832 is because Client B's local Bloom filter series 811 were previously synced with the authoritative Bloom filters 813, however the local cache 802 has not been updated with any other versions of "$Y_N$" because no one (e.g., the Requestor 308) has interrogated the local cache 802 for data-file-Y since the original entry of $Y_1$@Gen-1. As a result of this positive "hit", Client B interrogates the Server's authoritative database 525 to locate an updated version of "$Y_N$".

As shown in FIG. 8B, the new version "$Y_2$" is transmitted to Client B's local cache 802 replacing "$Y_1$" with the updated version "$Y_2$", step 868. Once received, Client B can forward on new version "$Y_2$" to the Requestor 308, step 860. Meanwhile (before, after, or during forwarding "$Y_2$" to the Requestor 308), the Server 520 updates (see arrow 812), or otherwise syncs, Client B with the third Bloom filter 834, step 864 (since the operation is a 'get' and the authoritative database 525 is unchanged, the generation stays at entry 279). At this point, the filter age is reset to zero thereby starting the clock for checking to see if the filter needs to be updated, step 866. Additionally, "$Y_2$" is tagged with Gen-279 in Client B's local cache 802 ($Y_2$@Gen-279), step 868.

Figure 9A:
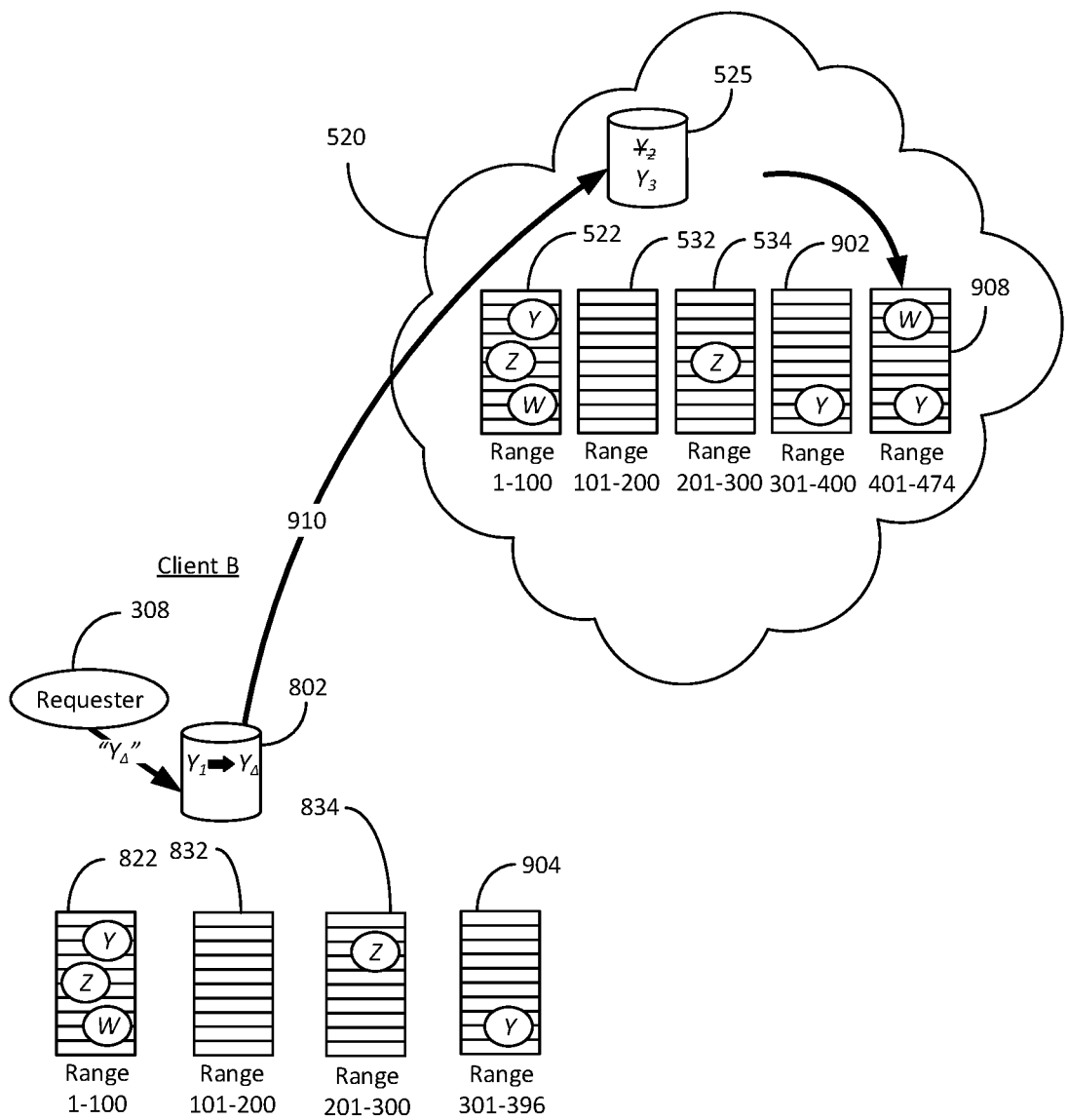
FIGS. 9A and 9B depict a block diagram example of altering a value of an entry consistent with embodiments of the present invention.
Figure 9B:
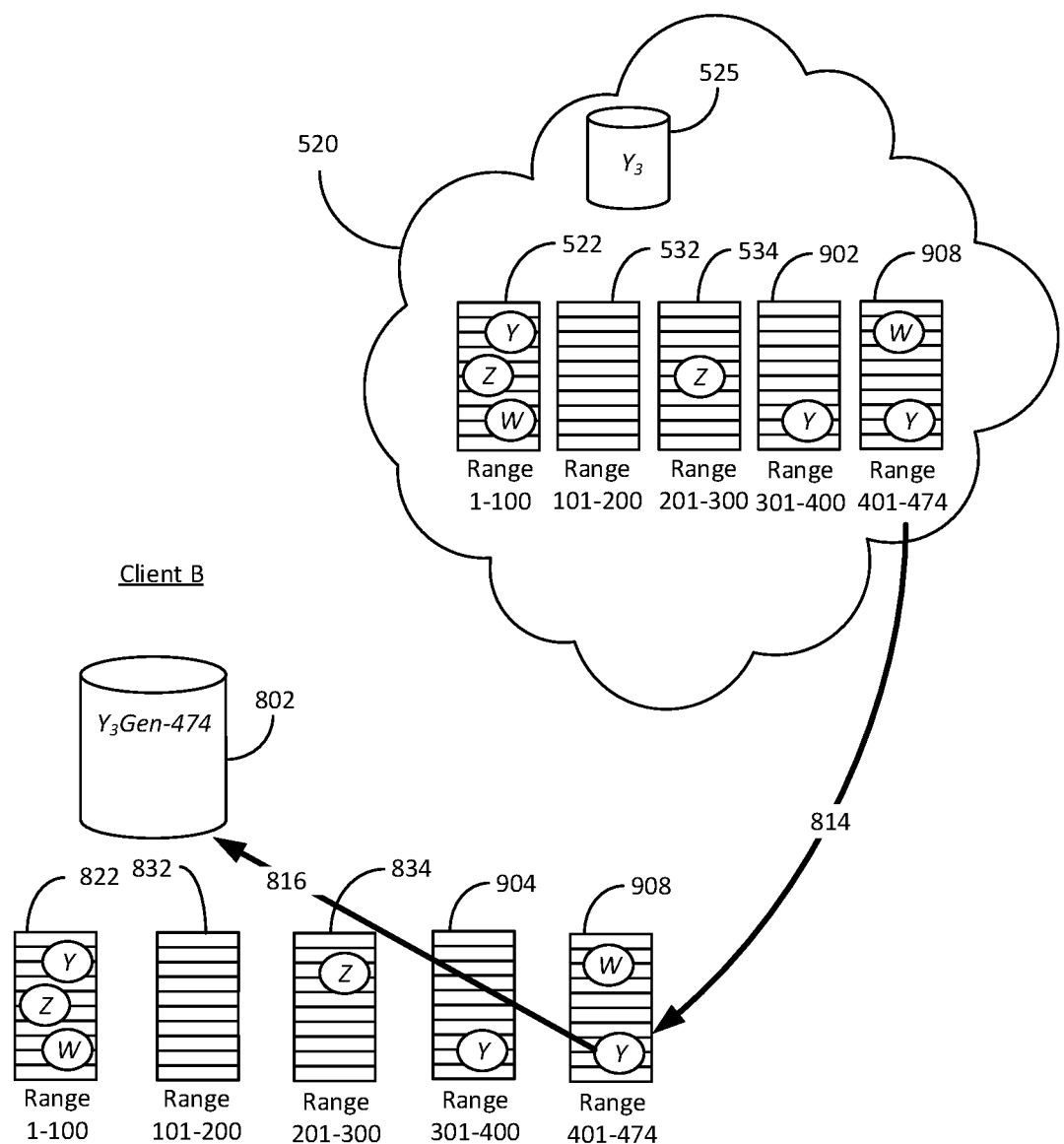
Figure 9C:
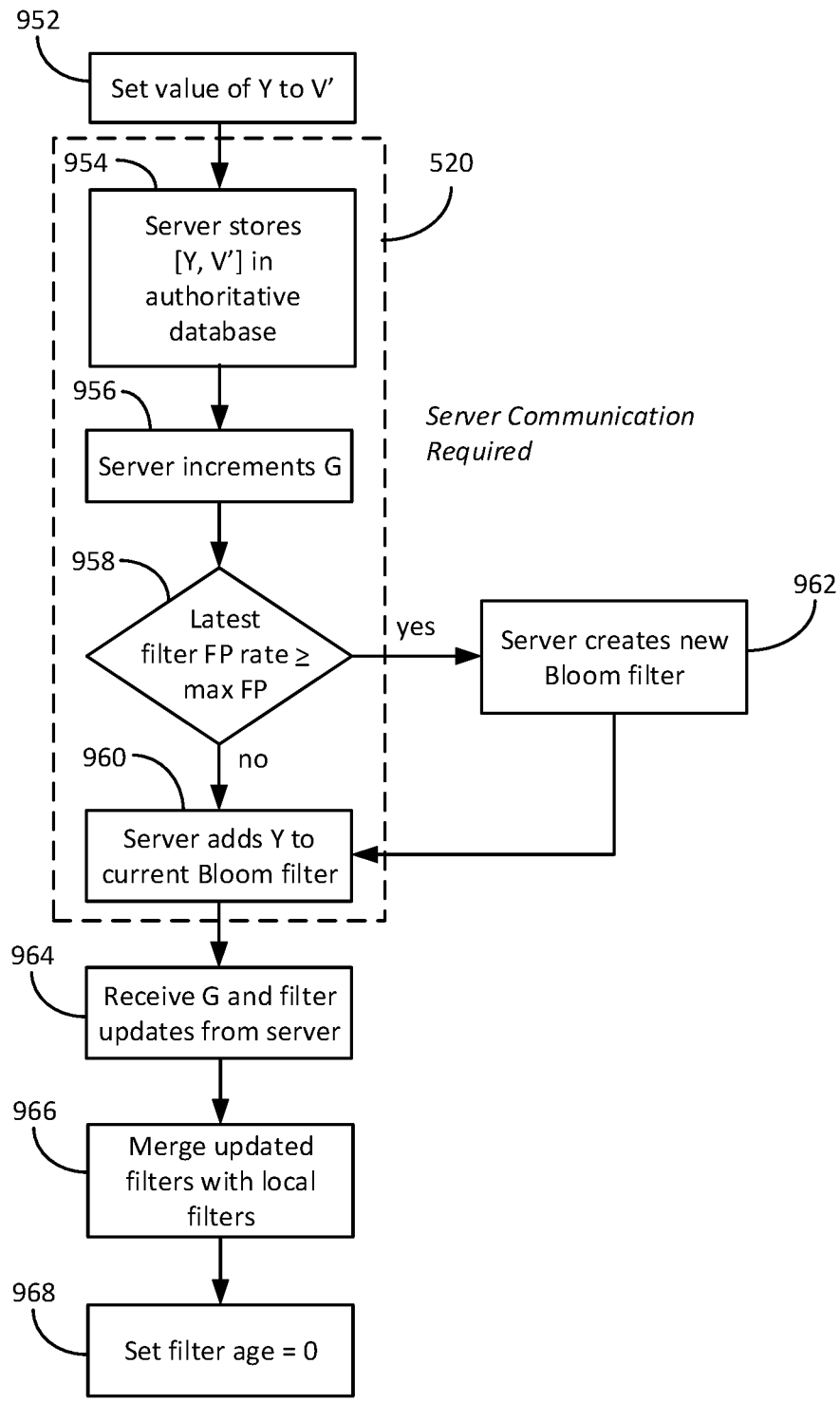
FIG. 9C is a method block diagram example describing the functions of FIGS. 9A and 9B consistent with embodiments of the present invention.

FIGS. 9A and 9B depict a block diagram example of altering a value of an entry consistent with embodiments of the present invention. FIGS. 9A and 9B are in view of method steps shown in method block diagram FIG. 9C. Assuming, in this next scenario, that Client B's local cache 802 is only in possession of "$Y_1$" when a Requestor 308 seeks to alter "Y" in Client B. FIG. 9A depicts a Requestor 308 altering a value of data-file-Y in Client B from "$Y_1$" to "$Y_\Delta$" ($\Delta$ denotes "change" used herein for shorthand), step 952. The change replacing "$Y_1$" to "$Y_\Delta$" is then made in Client B's local cache 802. "$Y_\Delta$" is sent up (arrow 910) to the Server 520 to be stored in the authoritative database 525, which replaces all other versions of "$Y_2$", step 954. Obviously, unbeknownst to Client B, there has been updates to data-file-Y by other clients, hence data file version "$Y_2$" in the authoritative database 525. The server 520 sets an increment Bloom filter entry of "Y" for the next authoritative Bloom filter register, step 956. Decision step 958 asks if the latest Bloom filter entry of "Y" exceeds the maximum Bloom filter range of the latest Bloom filter. If "yes", the server creates a new Bloom filter incrementing the range, step 962. If "no" than the server 520 simply adds latest Bloom filter entry of "Y" to the next Bloom filter register, step 960. Accordingly, the authoritative database 525 replaces "$Y_2$" with the new version "$Y_3$".

With regards to FIG. 9B, the Server 520 syncs the latest Bloom filter 908 with Client B, thus bringing Client B to date, step 964 and 966. Client B's cache 802 is also updated with the latest Bloom filter entry sequence of "$Y_3$@Gen474" reflecting the latest generation in the latest local Bloom filter 908. The local Bloom filter series age is reset to zero starting the clock on the predetermined amount of time before updating the local Bloom filter series, step 968.

Figure 10A:
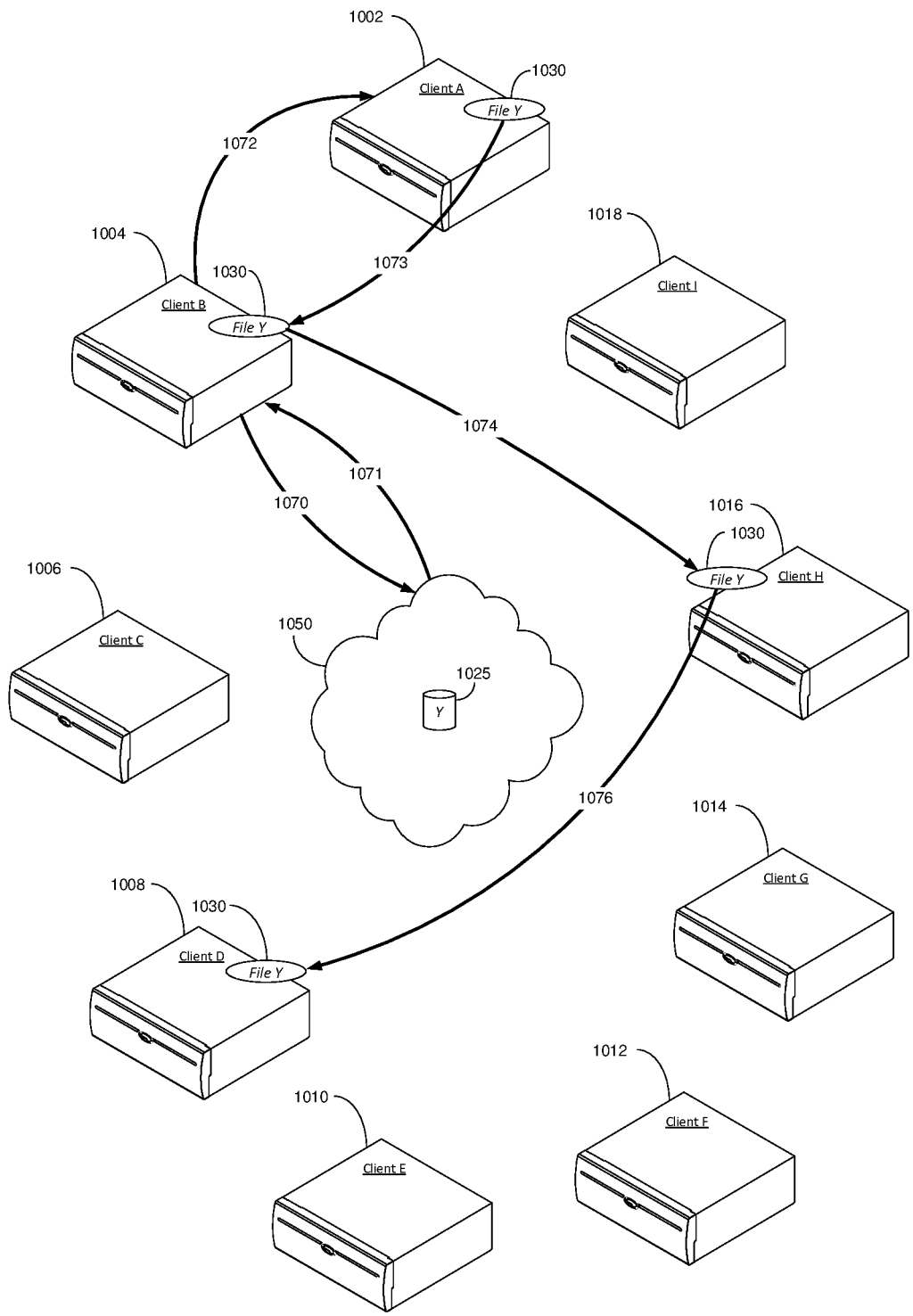
FIG. 10A depicts a block diagram of a commercial environment where embodiments of the present invention can be practiced consistent with embodiments of the present invention.

FIG. 10A depicts a block diagram of a commercial environment where embodiments of the present invention can be practiced consistent with embodiments of the present invention. As shown, nine Clients (Clients A-J 1002-1018) are in communication with a Cloud Based Server 1050, such as the cloud service AWS by Amazon Corporation of Seattle, Wash. Stored to Client A 1002 is a User Data File Y 1030, denoted here on out as "Data-File-Y" (which in this case is a lager file, for example larger than 1 TB). In this particular embodiment, Data-File-Y 1030 is not retained on the Cloud Based Server 1050 based on the size of Data-File-Y 1030. Instead, Data-File-Y 1030 is retained in Client A 1002. A key (or generic identifier) to Data-File-Y 1030, here on out referred to as "Y" 1032 for simplicity is the name or identifier of Data-File-Y 1030 no matter the generation of Data-File-Y 1030, which is just a few bits long. Embodiments envision the key capable of being a number of different tags such as names, identifiers, authorization codes, access controls, etc. Data-File-Y 1030 can further be tagged with metadata, here on out "Metadata-Y" 1034, pertaining to Data-File-Y 1030 and/or "Y" 1032. "Y" 1032 and Metadata-Y 1034 are stored both in the Cloud Based Server 1050 (more specifically "Y" 1032 and Metadata-Y 1034 are stored in the authoritative database 1025) and in Client A 1002.

Accordingly, in this embodiment, Client A 1002 is aware of Data-File-Y 1030 located at Client A 1002 and will authorize access to Client A 1002 with the proper key "Y" 1032. For example, if Client B 1004 is desirous of obtaining Data-File-Y 1030, Client B 1004 presents the key "Y" 1032 to the Cloud Based Server 1050 (arrow 1070). Based on authentication of "Y" 1032, the Cloud Based Server 1050 authorizes Client B 1004 access to Data-File-Y 1030 and provides the location information, which in some embodiments is included in Metadata-Y 134, for Data-File-Y 1030, which in this embodiment is at Client A 1002. Armed with this information, Client B 1004 reaches out to Client A 1002 (arrow 1072) and requests transferring a copy of Data-File-Y 1030 to Client B 1004 (arrow 1073). In the same manner, Data-File-Y 1030 is propagated to Clients H 1016 (arrow 1074) and Client D 1008 (arrow 1076). In performing data transfer in this way, the Clients utilize the centralized location and any generation/version information of Data-File-Y 1030 via the Cloud Based Server 1050 while managing costs of maintaining the relatively large Data-File-Y locally (out of the cloud 1050).

Figure 10B:
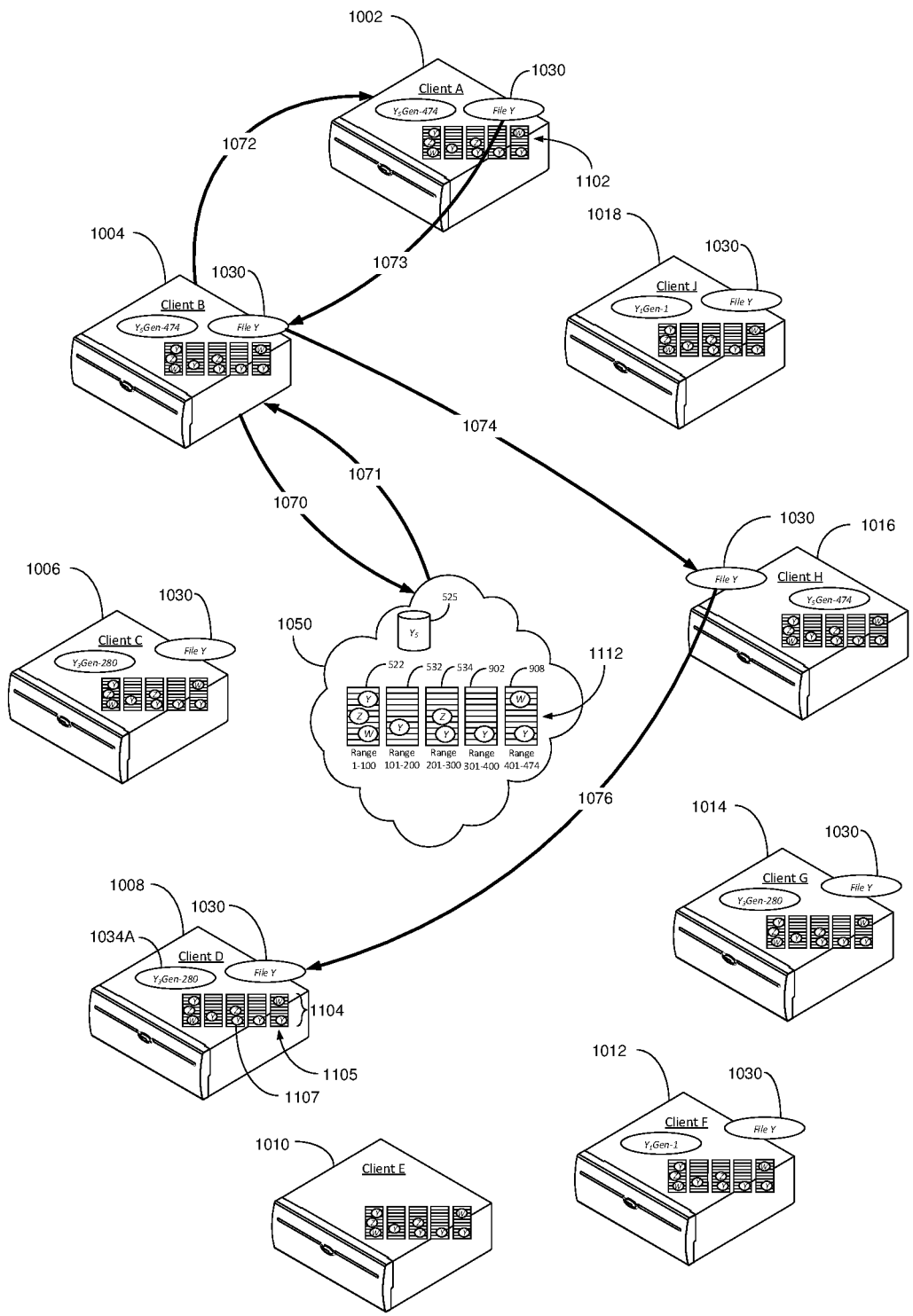
FIG. 10B depicts a block diagram of the commercial environment of FIG. 10A utilizing Bloom filters consistent with embodiments of the present invention.

FIG. 10B depicts a block diagram of the commercial environment of FIG. 10A utilizing Bloom filters consistent with embodiments of the present invention. Here, Client A 1002 possesses a local Bloom filter series A 1102 that maintains knowledge of activity in the network of Clients A-J 1002-1018 to the files accessible to Client A 1002 based on the propagation of the authoritative Bloom filter 1112 to all the clients. Certain embodiments envision the local Bloom filter A 1002 possessing knowledge of all files in the network of Client A 1002 to Client J 1018, based on updates from the authoritative Bloom filter 1112. Because the network of Clients can be quite large, it is advantageous to maintain a clear understanding of whether or not User Data Files in the network of Clients is current. This is easily accomplished with the Bloom filter scheme taught herein.

In one example, Data-File-Y 1030 is stored to Client A 1002 by a Requester (or user of data not shown). In this case Data-File-Y 1030 is a large data file (for example, larger than 1 TB). To be consistent with FIG. 10A, "Y" 132 and "Metadata-Y" 1034 are saved both in Client A 1002 and also in the Cloud Based Server 150. Furthermore, both Client A 1002 and the Cloud Based Server 1050 maintain a Bloom filter record of "Y" 1032. The most current Bloom filter is maintained and kept current by the Cloud Based Server 1050. The Cloud Based Server 1050 will update (sync) each Client every minute, for example, (or some other predetermined amount of time) if a Client has not had a transaction with the Cloud Based Server 1050 within the minute. Though this seems like a short amount of time, when considering the thousands of transactions that can occur per minute, this is a reasonable amount of elapsed time. It should be noted that by updating the Bloom filters every minute there is an insignificant exposure of not identifying an updated version of Data-File-Y 1030 right away. This is why this technique is considered an eventual consistency whereby the Clients will eventually all agree to the most updated version. As mentioned earlier, one trade-off of absolute consistency (whereby no possible conflicts could exist) is that it bogs down the system.

Assuming that the latest version of Data-File-Y 1030 has been transferred from Client A 1002 to Client B 1004 to Client H 1016 independently from going through the Cloud Based Server 1050 (saving money and time), the authoritative Bloom filter 1112 in the Cloud Based Server 1050 will keep track of the latest version of Data-File-Y 1030 via Metadata-Y, or "$Y_N$" 1034 and transmit the most up to date Bloom filter 1112 with the Bloom filter entry "Y" 132 in the most recent register of the authoritative Bloom filter 1112 to all of the Clients 1002-1018. In this embodiment, it is imperative to point to the latest version of Data-File-Y 1030 if a Requestor asks one of the many Clients in the network for Data-File-Y 1030 (for example to add data/information to Data-File-Y 1030 or update Data-File-Y 1030). Because only the Cloud Based Server 1050 (and more specifically, the authoritative database 525) has a record of which Client/s is/are in possession of the latest version of Data-File-Y 1030, the local Bloom filters provide the needed information to ascertain if their local copy of Data-File-Y 1030 is up to date. Accordingly, checking the their local Bloom filter will reduce traffic to the Cloud Based Server 1050, which is time and band-width consuming, especially when there are many Clients.

For example, assume the latest version of the Data-File-Y 1030 is in Client A and all the Clients are in sync. If Client D 1008 is interrogated by a Requestor (not shown) about Data-File-Y 1030 and Client D 1008 has a locally cached version of "$Y_3$" at Bloom filter generation 280, Client D 1008 can readily determine from the local Bloom filter series 1104 that "$Y_3$" (which was last updated in the third Bloom filter 1107 has been changed based on an entry of "Y" in the fifth local Bloom filter 1105. Accordingly, Client D 1108 reaches out to the Cloud Based Server 1050 and using "Y" asks where the latest version of Data-File-Y 1030 is residing. The Cloud Based Server 1050 directs attention to Client H 1016, which then transfers the new version of ($5^{th}$ version) Data-File-Y 1030 to Client D 1008. Client D 1008 is also updated in the local cache with "Ys" and the updated/synced Bloom filter series from the authoritative Bloom filter series 1112. Client D 1008 communicates all transactions and changes to Metadata-Y (e.g. "$Y_6$") to the Cloud Based Server 1050, which then updates the authoritative database 525 and the Server Bloom filter 1112.

Some embodiments of the present invention envision cycling through Bloom filters whereby older Bloom filters "time out". For example, in one embodiment the authoritative Bloom filters may only maintain ten individual series at any given time. If each Bloom filter has a range of 100 entries, the tenth Bloom filter would go up to the $1000^{th}$ entry. The next entry would start a new Bloom filter at the 1001 entry and the first Bloom filter (range 1-100) would be erased. In this way, every time a new Bloom filter is introduced, the earliest Bloom filter would be decommissioned so that there would always be ten Bloom filters in a series with an ever growing range. Though in certain embodiments, clients may retain older Bloom filters than that maintained by the Cloud 1050, other embodiments contemplate the authoritative Bloom filter 1112 syncing with all client Bloom filters all having the same ranges.

In the event Bloom filters are decommissioned, certain embodiments further envision the Clients dumping, or otherwise deleting, entries for files (file metadata) from their local caches if a Bloom filter series no longer has a related linked key. In this case, if a Requestor seeks a file at a Client that no longer has an entry in a local Bloom filter, then the Client simply sends an inquiry to the Cloud 1050. In fact, any lack of information for a file if either absent from a local Bloom filter or otherwise in question, the Client will simply reach out to the Cloud 1050 for a definitive answer.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though aspects of the present invention depict just a few Bloom filters many could equally be used while still maintaining substantially the same functionality without departing from the scope and spirit of the present invention. Another example can include using a key with perhaps other related data while still preserving the main data objectives of reducing network traffic or otherwise streamlining and improving performance when linking into the public cloud. It should be appreciated that though not explicitly described, the "brains" of the Cloud and Clients include the appropriate hardware and software (controllers, routers, wiring, processors, software and the like) well known to those skilled in the art. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A centralized server adapted to manage an authoritative database and an authoritative Bloom filter series, the centralized server comprising:
   a plurality of data entries contained in the authoritative database, each of the data entries are subject to be altered with an updated data entry version;
   a plurality of generic identifiers each specific to one of the data entries, each of the generic identifiers remains constant even when one of the data entries is altered with an updated data entry version;
   the Bloom filter series comprising at least a first Bloom filter and a second Bloom filter, each of the Bloom filters comprising a plurality of registers configured to positively indicate when a representation of one of the generic identifier is present, each of the Bloom filters is configured to sequentially receive a Bloom filter entry of one of the representations every time one of the data entries is altered, the first Bloom filter configured to receive a maximum number of Bloom filter entries over a first generation range before the second Bloom filter receives any Bloom filter entries;
   a communication link to a first client, the first client configured to receive and maintain a copy of the Bloom filter series over the communication link, the copy of the Bloom filter series configured to furnish the client with knowledge of the updated data entry versions that the client can consult before consulting the centralized server.

2. The centralized server of claim 1 further linked to a plurality of clients, each of the clients configured to receive and maintain a copy of the Bloom filter series provided by the centralized server to furnish the client with the knowledge of the updated data entry versions without back and forth communications with the centralized server.

3. The centralized server of claim 2 wherein the plurality of clients are networked together.

4. The centralized server of claim 1 wherein the generic identifiers are keys and the data entries are meta data for files maintained in the client.

5. The centralized server of claim 1 wherein the one of the data entries is meta data for a user data file retained in the client and the updated data entry version is updated meta data for an altered version of the user data file.

6. The centralized server of claim 1 wherein the first Bloom filter has a first range of Bloom filter entries from a first Bloom filter entry to a maximum number of Bloom filter entries and the second Bloom filter has a second range of Bloom filter entries from the maximum number plus one Bloom filter entry to a second Bloom filter maximum number of Bloom filter entries.

7. The centralized server of claim 1 wherein if the client knows of only the Bloom filter entry for the generic identifier in the first Bloom filter but finds a new Bloom filter entry for the generic identifier in the second Bloom filter then the client knows that the data entry specifically tied to the generic identifier is altered.

8. The centralized server of claim 1 wherein the data entries include meta data about a user data file, user authentication data, encryption keys, access control, caching locations, users and groups.

9. The centralized server of claim 1 further comprising means for transferring one user data file from a first client to a second client, the second client networked with the centralized server and the first client.

10. The centralized server of claim 1 wherein the representation of the generic identifier is created by hashing the generic identifier through at least two hash function generators.

11. A method of reducing network traffic using Bloom filter series, the method comprising:
   providing a centralized server with an authoritative database and an authoritative Bloom filter series, the centralized server linked with a network of clients;
   generating Y1 data and a generic Y-identifier paired with the Y1 data in a first client of the network of clients, the Y1 data is retained in a first client cache, the Y1 data is a data element and Y2 is an updated data element version of the Y1 data;
   transmitting the Y1 data and the generic Y-identifier from the first client to the centralized server;
   storing the Y1 data to the authoritative database;
   generating a first Bloom filter entry of the generic Y-identifier in a first Bloom filter of the authoritative Bloom filter series;
   storing, at each of the clients, a local Bloom filter series that is a copy of the authoritative Bloom filter series that includes the generic Y-identifier located in the first Bloom filter;
   at the first client, generating a Y-identifier pointer to the first Bloom filter entry in the copy of the first Bloom filter of the local Bloom filter series;
   altering the Y1 data to the Y2 data at one of the clients;
   the one of the clients informing the centralized server of the Y2 data;
   replacing the Y1 data with the Y2 data in the authoritative database;
   generating a second Bloom filter entry corresponding to the generic Y-identifier in a successive Bloom filter that is successive to the first Bloom filter of the authoritative Bloom filter series as a consequence of the Y2 data; and
   updating the local Bloom filter series with the second Bloom filter entry of the generic Y-identifier in a copy of the successive Bloom filter at each of the clients.

12. The method of claim 11 wherein the Bloom filter entry is generated by calculating at least one value of the generic Y-identifier, the value corresponding to at least one Bloom filter register of the Bloom filters in the authoritative Bloom filter series the generic Y-identifier.

13. The method of claim 12 wherein the at least one value is calculated via a hash function generator.

14. The method of claim 12 wherein the first Bloom filter entry is one of a plurality of Bloom filter entries corresponding to at least one of the Bloom filter registers in the first Bloom filter, the method further comprising generating a next successive Bloom filter in the Bloom filter series when the registers in the first Bloom filter reaches a predetermined number of entries.

15. The method of claim 14 wherein all of the Bloom filters possess a range of entries before moving to a next successive Bloom filter.

16. The method of claim 11 further comprising retaining the Y2 data in a local cache of the one of the clients and generating a new Y-identifier pointer to the second Bloom filter entry in the copy of the successive Bloom filter of the local Bloom filter series of the one of the clients.

17. The method of claim 11 further comprising:
at the one of the clients, referred to as second client, receiving a request for a most recent version of Y-data;
identifying the data in a second cache belonging to the second client;
checking the second client's local Bloom filter series for any entries corresponding to the Y-identifier in a later local Bloom filter for a third Bloom filter entry;
finding no third Bloom filter entry in a later local Bloom filter; and
fulfilling the request with the Y2 data from the second cache without interacting with the centralized server.

18. The method of claim 11 further comprising:
at the first client, receiving a request for a most recent version of Y-data;
identifying the Y1 data in the first client cache;
checking the local Bloom filter series for any entries corresponding to the Y-identifier following the first Bloom filter entry;
locating the second Bloom filter entry corresponding to the generic Y-identifier in the first client's copy of the successive Bloom filter;
interrogating the authoritative database for the most recent version of Y-data;
replacing the Y1 data with the Y2 data in the local cache at the first client based on the interrogating step; and
at the first client, generating a new Y-identifier pointer to the first client's copy of the successive Bloom filter entry of the local Bloom filter series.

19. The method of claim 11 further comprising fulfilling the request with the Y-data-2 from the local cache at the first client.

20. A method of improving network speeds by reducing network traffic using a Bloom filter series, the method comprising:
providing a centralized server linked with at least one client, the centralized server possessing an authoritative database and an authoritative Bloom filter series that comprises a plurality of successive Bloom filters each defined by a successive range of entries;
updating, at the client, a client Bloom filter series with the authoritative Bloom filter series;
the client managing a generic identifier and having knowledge that a Bloom filter entry corresponding to the generic identifier is located in a first Bloom filter of the client Bloom filter series; and
searching in the client Bloom filter series for a later Bloom filter entry corresponding to the generic identifier in a second Bloom filter that is successive to the first Bloom filter.

21. The method of claim 20 wherein the generic identifier is paired with a data file, if the later Bloom filter entry corresponding to the generic identifier is not found in the second Bloom filters then the client accepting the data file is unaltered and the client does not need to interact with the centralized server to download a new version of the data file.

22. A method comprising:
providing a centralized server linked to plurality of clients including a first client;
providing an authoritative Bloom filter series comprising at least a first Bloom filter and a second Bloom filter;
providing a key identifying an old data file version and an update data file version, the old data file version located at the first client, the updated data file version located at the centralized server;
providing a first Bloom filter entry and a second Bloom filter entry, both corresponding to the key;
providing a first Bloom filter having a first range of Bloom filter entries containing the first Bloom filter entry, a second Bloom filter having a second range of Bloom filter entries containing the second Bloom filter entry;
periodically updating a copy of the authoritative Bloom filter series at each of the clients;
invalidating the old data file version over the updated data file version after discovering that the copy of the second Bloom filter contains the second Bloom filter entry; and
after the invalidating step, transferring the updated data file version from the centralized server to the first client.

* * * * *